(12) United States Patent
Shields

(10) Patent No.: US 11,961,240 B2
(45) Date of Patent: Apr. 16, 2024

(54) SYSTEMS AND METHODS FOR IMPROVED OBSERVATION AND DETECTION USING TIME VIDEO SYNCHRONIZATION AND SYNCHRONOUS TIME AVERAGING

(71) Applicant: Mechanical Solutions Inc., Whippany, NJ (US)

(72) Inventor: Timothy Shields, Colorado Springs, CO (US)

(73) Assignee: MECHANICAL SOLUTIONS INC., Whippany, NJ (US)

( * ) Notice: Subject to any disclaimer, the term of this patent is extended or adjusted under 35 U.S.C. 154(b) by 267 days.

(21) Appl. No.: 17/345,798

(22) Filed: Jun. 11, 2021

(65) Prior Publication Data

US 2022/0398743 A1    Dec. 15, 2022

(51) Int. Cl.
| | | |
|---|---|---|
| *G06K 9/00* | (2022.01) | |
| *G06T 7/00* | (2017.01) | |
| *G06T 7/20* | (2017.01) | |
| *G08B 21/18* | (2006.01) | |

(52) U.S. Cl.
CPC .............. *G06T 7/20* (2013.01); *G06T 7/97* (2017.01); *G06T 2207/10016* (2013.01); *G08B 21/182* (2013.01)

(58) Field of Classification Search
CPC ... G06T 7/20; G06T 7/97; G06T 2207/10016; G06T 2207/20216; G06T 7/254; G08B 21/182
See application file for complete search history.

(56) References Cited

U.S. PATENT DOCUMENTS

| | | |
|---|---|---|
| 7,196,644 B1 | 3/2007 | Anderson et al. |
| 7,843,510 B1 | 11/2010 | Ayer et al. |
| 8,786,680 B2 | 7/2014 | Shiratori et al. |
| 10,593,167 B2 | 3/2020 | Gervais et al. |
| 2009/0139334 A1* | 6/2009 | Mustonen .............. G01H 1/003 73/579 |

(Continued)

FOREIGN PATENT DOCUMENTS

| | | |
|---|---|---|
| WO | 2014024121 A1 | 2/2014 |
| WO | 2019222833 A1 | 11/2019 |

OTHER PUBLICATIONS

Wolfgang Strickling, "Shadow bands during a total solar eclipse", last updated Sep. 17, 2017. http://www.strickling.net/shadowbands.htm.

(Continued)

*Primary Examiner* — Emily C Terrell
*Assistant Examiner* — Owais Iqbal Memon
(74) *Attorney, Agent, or Firm* — Schmeiser, Olsen & Watts, LLP

(57) ABSTRACT

A system and method for detecting motion with respect an object includes providing a processor and at least one video sensor; synchronizing the at least one video sensor to a dynamic event associated with the object; recording, by the at least one video sensor, a plurality of data sets including the object, each data set of the plurality of data sets being synchronized with respect to the dynamic event associated with the object; averaging, by the processor, the plurality of data sets to provide an averaged synchronized data set; and calculating, by the processor, a motion with respect to the object based on the averaged synchronized data set.

17 Claims, 31 Drawing Sheets

(56) References Cited

U.S. PATENT DOCUMENTS

| | | | |
|---|---|---|---|
| 2011/0080211 A1 | 4/2011 | Yang et al. | |
| 2013/0002968 A1 | 1/2013 | Bridge et al. | |
| 2013/0122845 A1 | 5/2013 | Loewenstein | |
| 2015/0324636 A1* | 11/2015 | Bentley | A63F 13/212 386/227 |
| 2016/0217587 A1* | 7/2016 | Hay | A61B 5/0077 |
| 2016/0273957 A1 | 9/2016 | Bendele et al. | |
| 2017/0169575 A1 | 6/2017 | Antonio et al. | |

OTHER PUBLICATIONS

Justin G. Chen, et al. Video Camera-Based Vibration Measurement for Civil Infrastructure Applications, Journal of Infrastructure Systems, 23(3), 2016.

Timothy A. Dunton, "An Introduction to Time Waveform Analysis", https://reliabilityweb.com/articles/entry/an_introduction_to_time_waveform_analysis.

S. Braun, "The synchronous (time domain) average revisited", May 10, 2010. Mechanical Systems and Signal Processing 25 (2011) 1087-1102.

Hasan, Afzal. Patentability Search Report for VibVue Time Video Synchronization (TVS) Method, dated Jun. 23, 2020.

Z. Gao, et al. Averaging video sequences to improve action recognition, 2016 9th International Congress on Image and Signal Processing, BioMedical Engineering and Informatics (CISP-BMEI), Datong, 2016, pp. 89-93.

Mehrube Mehrubeoglu, et al. Object tracking using multiple camera video streams, SPIE Proceedings, vol. 7724, 2010.

Franscois Petitjeana, et al. Summarizing a set of time series by averaging: From Steiner sequence to compact multiple alignment, Theoretical Computer Science, vol. 414, Issue 1, 2012, pp. 76-91.

Ferran-Diego, Probabilistic Alignment of Video Sequences recorded by Moving Cameras, Universitat Autonoma de Barcelona, Jul. 22, 2011.

Cheng Lu et al. A Robust Technique for Motion-Based Video Sequences Temporal Alignment, IEE Transactions on Multimedia, vol. 15, No. 1, Jan. 2013, pp. 70-82.

Yaron Caspi et al. A step towards sequence-to-sequence alignment, Proceedings IEEE Conference on Computer Vision and Pattern Recognition. CVPR 2000 (Cat. No.PR00662), Hilton Head Island, SC, 2000, pp. 682-689 vol. 2.

\* cited by examiner

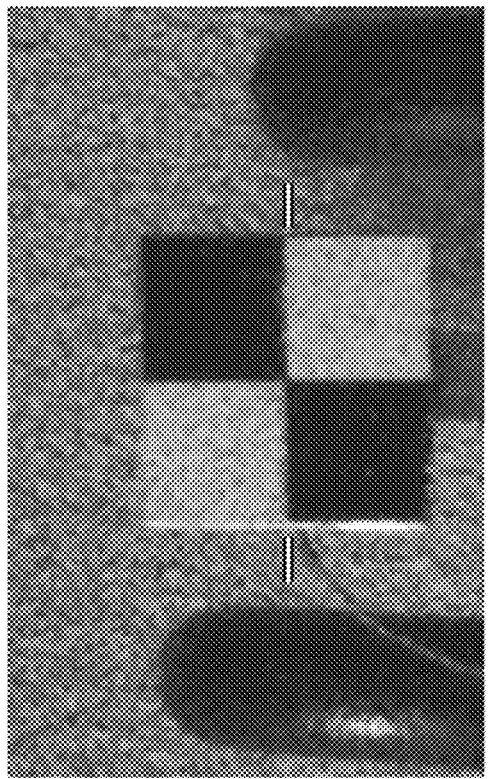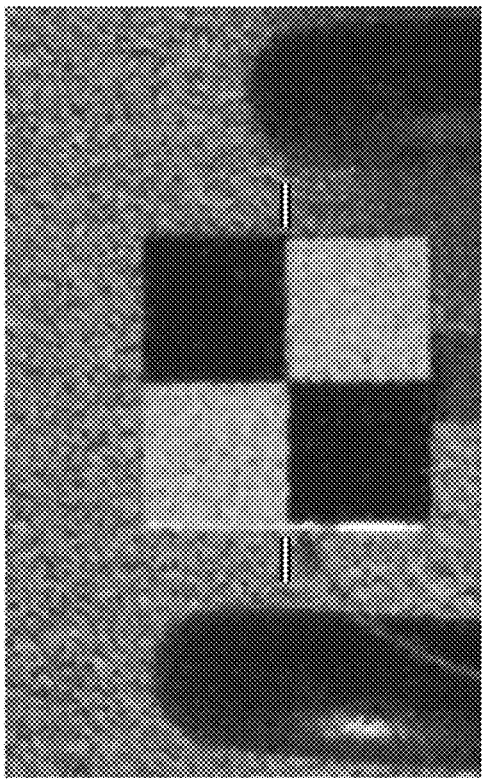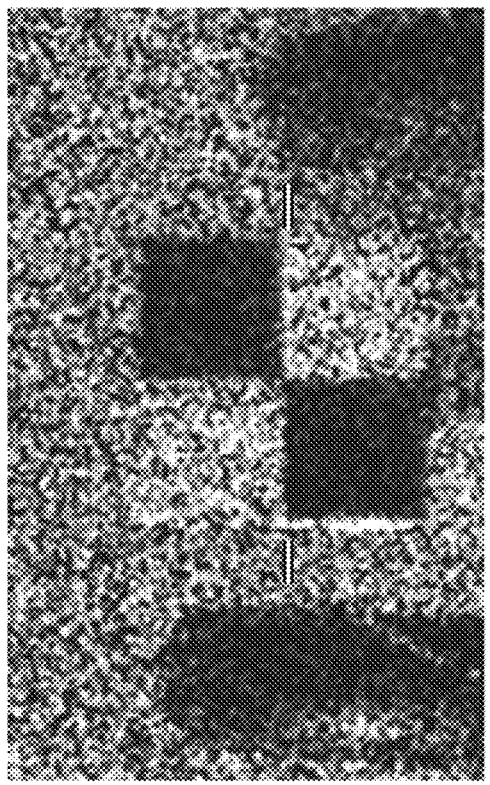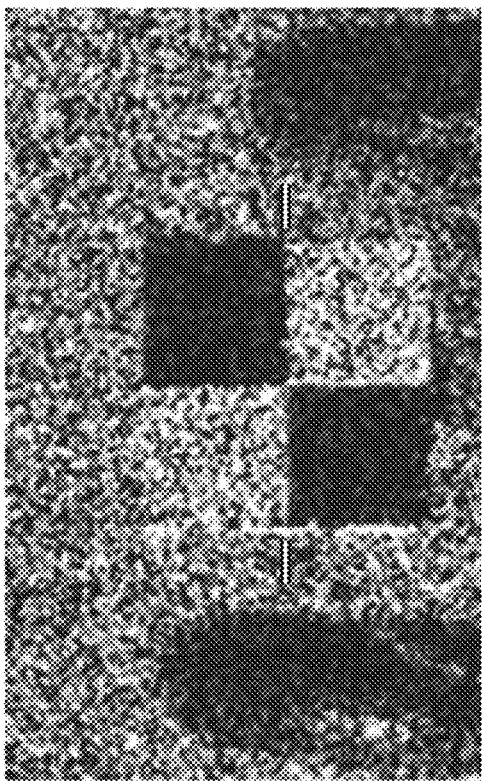
FIG. 12A
FIG. 12B
FIG. 11A
FIG. 11B

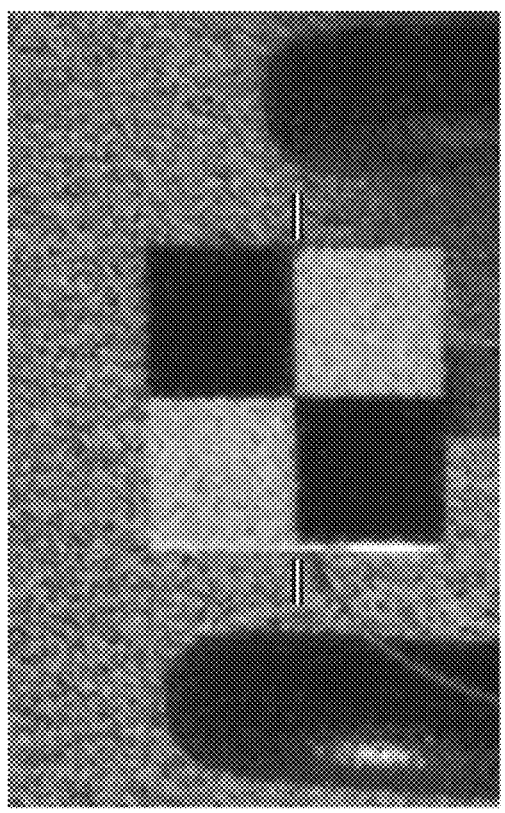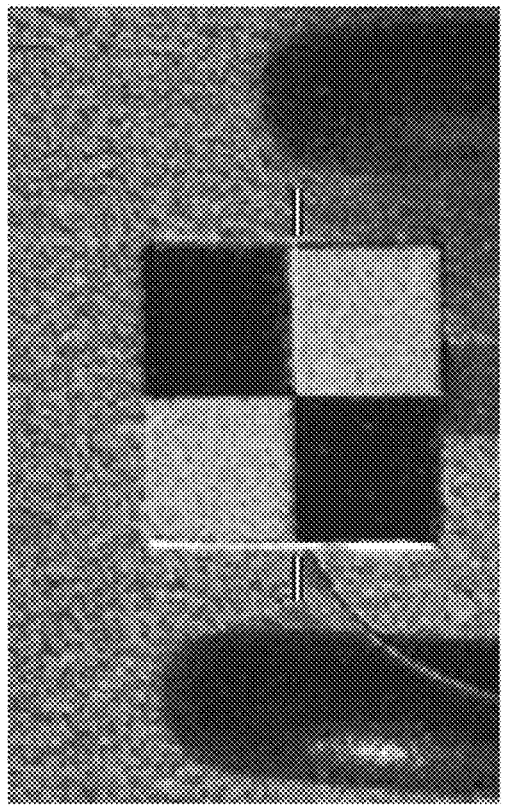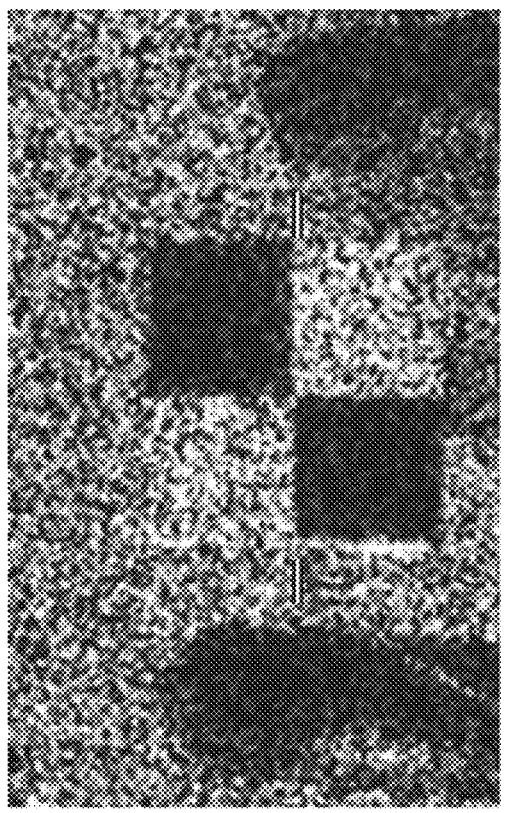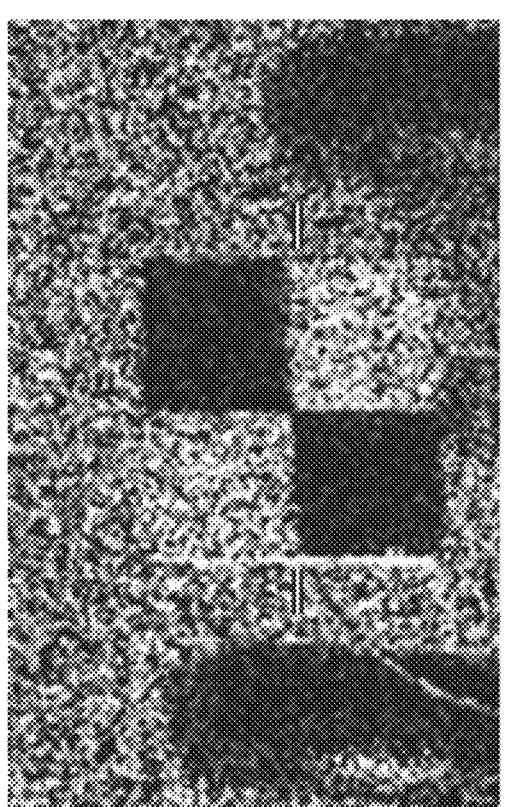
FIG. 14C
FIG. 14D
FIG. 13C
FIG. 13D

1X: 26.7Hz (Position 1)

1X: 26.7Hz (Position 2)

1X: 26.7Hz (Position 3)

1X: 26.7Hz (Position 4)

2X: 53.5Hz (Position 1)

2X: 53.5Hz (Position 2)

2X: 53.5Hz (Position 3)

2X: 53.5Hz (Position 4)

5X: 133.5Hz (Position 1)

5X: 133.5Hz (Position 2)

5X: 133.5Hz (Position 3)

5X: 133.5Hz (Position 4)

SYSTEMS AND METHODS FOR IMPROVED OBSERVATION AND DETECTION USING TIME VIDEO SYNCHRONIZATION AND SYNCHRONOUS TIME AVERAGING

TECHNICAL FIELD

The present invention relates to systems and methods for observation and detection of motion, for example, vibration, rotation, and/or displacement of an object. The systems and methods may include or use multiple recordings from a camera system. The recordings may be synchronized to the motion of the object. An averaged synchronized recording may be obtained from the multiple synchronized recordings. The averaged synchronized recording may significantly increase the signal to noise ratio for the motion of the object and allow improved observation/detection/quantification of the motion, especially at levels that would otherwise be below a noise threshold.

BACKGROUND

Camera systems are used to detect and observe various types of motion. For example, camera systems are often used with rotating equipment and other machinery to detect/observe motion as part of analysis processes, maintenance processes, and the like. With respect to such equipment and machinery, even small motion and vibration may be important. For example, vibration may indicate improper operation, worn or defective components, or other problems that reduce efficiency, damage equipment, or are otherwise undesirable. Thus, detection of even small vibrations may be beneficial; however, camera systems often reach a fundamental limit past which vibrations are too miniscule to be detected. For example, at a certain point the camera hardware may not be able to accurately differentiate noise from vibration/motion. Improved methods and systems for detecting such vibrations would be well received in the art.

SUMMARY

An embodiment of the present invention relates to a method for detecting motion with respect to an object, comprising: providing a processor and at least one video sensor; synchronizing the at least one video sensor to a dynamic event associated with the object; recording, by the at least one video sensor, a plurality of data sets including the object, each data set of the plurality of data sets being synchronized with respect to the dynamic event associated with the object; averaging, by the processor, the plurality of data sets to provide an averaged synchronized data set; and calculating, by the processor, a motion with respect to the object based on the averaged synchronized data set.

A further embodiment of the present invention relates to a system for detecting motion with respect to an object, comprising: a processor and at least one video sensor; wherein the at least one video sensor is configured to be synchronized to a dynamic event associated with the object; wherein the at least one video sensor is configured to record a plurality of data sets including the object, each data set of the plurality of data sets being synchronized with respect to the dynamic event associated with the object; wherein the processor is configured to average the plurality of data sets to provide an averaged synchronized data set; and wherein the processor is configured to calculate a motion with respect to the object based the averaged synchronized data.

A further embodiment of the present invention relates to a computer program product, comprising a computer readable hardware storage device storing a computer readable program code, the computer readable program code comprising an algorithm that when executed by a computer processor of a computing system implements a method for detecting motion with respect to an object, the method comprising: receiving, from a video sensor, a plurality of data sets including the object, each data set of the plurality of data sets being synchronized with respect to a dynamic event associated with the object; averaging the plurality of data sets to provide an averaged synchronized data set; and calculating a motion with respect to the object based on the averaged synchronized data set.

BRIEF DESCRIPTION OF THE DRAWINGS

FIG. 11A shows a midpoint of calculated motion at the 15 Hz frequency using unaveraged data;

FIG. 11B shows a bottom point of calculated motion at the 15 Hz frequency using unaveraged data;

FIG. 12A shows a midpoint of calculated motion at the 15 Hz frequency using averaged data;

FIG. 12B shows a bottom point of calculated motion at the 15 Hz frequency using averaged data;

FIG. 13C shows a second midpoint of calculated motion at the 20 Hz frequency using unaveraged data;

FIG. 13D shows a top point of calculated motion at the 20 Hz frequency using unaveraged data;

FIG. 14C shows a second midpoint of calculated motion at the 20 Hz frequency using averaged data;

FIG. 14D shows a top point of calculated motion at the 20 Hz frequency using averaged data;

DETAILED DESCRIPTION

Figure 1:
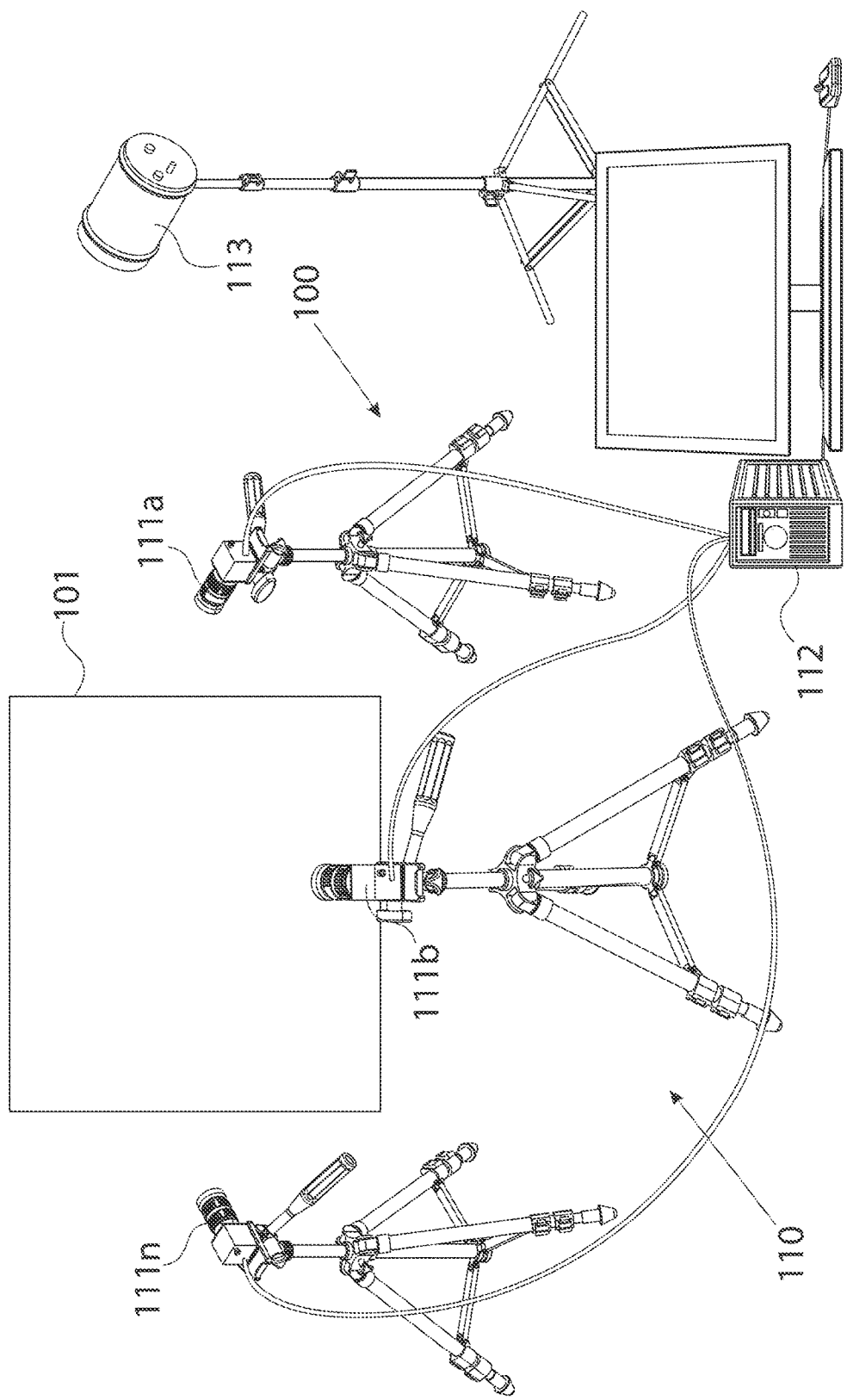
FIG. 1 depicts a schematic view of a time video synchronization system in accordance with embodiments of the present invention.

Motion and vibration detection may be important for analysis of machinery condition and operating state, for example, in rotating machinery, manufacturing equipment, transportation equipment, oil and gas equipment, power generation machinery, and other systems, comprising pumps, compressors, turbines, expanders, piping, pressure vessels, etc. Detection of even small motions and vibrations may be needed to provide a proper analysis of the machinery/system; however, detection of such small motions and vibrations may be difficult or impossible due to a noise threshold of a respective sensor system, for example, a camera system. For example, the camera system may not be able to accurately detect motion or vibration below a certain point, instead, the motion or vibration may be lost in noise picked up by the sensor system/camera system.

Averaging methods such as RMS averaging may help to improve a vibration signal to noise ratio; however, such methods provide only minimal improvement and are unsatisfactory. For example, such averaging often does not reduce the noise floor and does not improve detection of motion at transient harmonic frequencies.

Embodiments of the disclosed invention may use synchronous time averaging as is discussed in more detail below. For example, synchronized recordings of a target object may be captured by the sensor system/camera system. Further, a plurality of such synchronized recordings may be taken. The synchronized recordings may be any number of individual frames in length. An averaged synchronized recording or averaged data from such recordings may be obtained from the plurality of synchronized recordings. As shown in the following embodiments, the averaged synchronized recording may demonstrate significantly improved signal to noise ratio for the target object/target motion and may allow observation/detection of motion that would otherwise not be observable/detectable by the respective hardware of the sensor system/camera system.

Embodiments of the invention are uniquely tailored to detecting repetitive movement such as periodic movement and/or vibratory movement in a highly accurate manner. When properly synchronized to the object, for example, synchronized with respect to a dynamic event associated with the object or a motion of the object, as disclosed herein, embodiments of the invention improve analysis even with the use of conventional sensor and camera hardware. Thus, a greatly improved fidelity (improved signal to noise ratio) result may be realized that would otherwise be impossible to obtain.

Embodiments of the invention may also have application to condition monitoring. For example, synchronized recordings may be captured for a duration of time. As discussed, an averaged synchronized recording may be obtained which includes a significantly improved signal to noise ratio for the target object/target motion over that duration of time. Observation/detection of additional motion that would otherwise not be observed/detected may then be realized. This allows for improved detection of any deviations from a long term average or baseline. Further, any deviation that exceeds a threshold may trigger a warning or further analysis.

Referring now to the drawings, FIG. 1 depicts a time video synchronization system 100 configured to implement embodiments of the present invention. The time video synchronization system 100 may perform a synchronous time averaging method as discussed in more detail below. The time video synchronization system 100 includes a sensor system 110. The sensor system 110 comprises at least one sensor device 111. In the depicted embodiment, sensor devices 111a, 111b ... 111n are used. In some embodiments only a single singe device 111 may be used. The sensor system 110 may comprise a camera system in which the at least one sensor 111 comprises a camera device. For example, the sensor system may be capable of capturing video over a time interval. The sensor system 110 may also include a light source such as light source 113.

As is known in the art, sensor systems, such as the sensor system 110, and sensor devices, such as the at least one sensor device 111, have inherent noise. High gain settings amplify the noise and result in "snow" or blurriness. In some instances, artificial motion may also be generated/appear due to the inherent noise. While better quality sensor systems and sensor devices may have less noise as well as higher resulting signal to noise ratios, some level of noise is generally unavoidable. Further, improved sensor quality comes with increasing cost and expense.

Referring still to FIG. 1, the sensor system 110 may comprise, or may be in communication with, a processor 112, for example, a processor of a computing system. The processor 112 may control the at least one sensor device 111. The processor 112 may also be configured to process and/or analyze information from the at least one sensor device 111, for example, video captured by the at least one sensor.

In embodiments, the sensor system 110 and/or the at least one sensor device 111 may be synchronized to an object 101 for which motion and/or vibration is to be detected. In embodiments, the object 101 may be, for example, a rotating machine or a component of the rotating machine. The object 101 may be any type of object for which detection is desired. The sensor system 110 and/or the at least one sensor device 111 may be synchronized to a dynamic event of the object 101 or to a dynamic event associated with the object. For example, in some embodiments the sensor system 110 and/or the at least one sensor device 111 may be synchronized to a timing of the object or other aspect of the object 101. In some embodiments, the dynamic event of the object 101 may be an expected or known motion. In embodiments where the object 101 is a rotating machine, the at least one sensor device 111 may be synchronized to the rotation of the rotating machine, i.e., the dynamic event may be the rotational position of the rotating machine, phase of the machine, or the like. In other embodiments, the dynamic event may be an impulse on the object or the timing of some other action taken by, or taken with respect to, the object. Synchronization of the at least one sensor device 111 may be of any kind, for example, direct or indirect, optical, electrical, or mechanical, and the like. In some embodiments, synchronization may be accomplished by at least one of: a key phasor, directly measured vibration, recording frames at a known rate, excitation source, and the like.

Synchronization of harmonics (above or below the synchronization frequency) may be automatically achieved. For example, when the at least one sensor device 111 is synchronized to the rotation of a rotating machine, the at least one sensor device 111 may also be synchronized to multiples of the rotation (2×, 3×, etc.) as well as portions of the rotation (½×, ¼×, etc.). Such harmonics may be useful in evaluating and/or diagnosing specific vibration or motion with an object, for example, within a rotating machine. For example, it is known that rotating machines that are imbalanced may have a specific vibration/motion that occurs at the same point in the rotation every time (1×) while offset or misaligned machines may have a specific vibration/motion that occurs at either or both 1× and 2× the rotation speed. Thus, being able to detect vibration/motion at these values while distinguishing them from noise is often beneficial.

Due to the disclosed synchronization with respect to the object, multiple data sets of sensor information may be used. For example, a plurality of data sets of sensor information, such as a plurality of image frames, all or a portion of pixels of multiple image frames, selected periods of time, image pixels, sections of video files, entire video files, data relating to such images, data related to such pixels, data related to such frames, and the like may be captured. For clarity, the terms data set and plurality of data sets may include any arrangement, collection, set, series, group, compilation, etc. of data from the sensor system 110 and/or the at least one sensor device 111. Each data set of sensor information will be synchronized with respect to the event/object and thus each will be synchronized with respect to any other data sets of the plurality of data sets of sensor information. In some embodiments, the plurality of data sets may include measures of light intensity exhibited by one or more pixels in one or more digital video frames.

Synchronization may be used on an individual image or frame basis in some embodiments. Thus, each image, frame, or portion thereof captured by the at least one sensor system 110 may be synchronized. Alternatively, synchronization may be achieved by synchronizing the start time of a data set of sensor information. In embodiments, the plurality of data sets of sensor information may have a consistent duration as well. For example, in an embodiment, multiple 10 second data sets may be captured. Each 10 second data set may be synchronized to the object 101, for example, to the rotation of the rotating machine. Thus, each 10 second data set captures the same rotational portion of the rotation of the rotating machine. Of course, the data sets may be of any duration desired. As an example, in an embodiment the data sets may be video files, such as 10 second video files. Alternatively, the video files may be any time in duration or any number of frames in length.

Further, while the multiple data sets may be acquired from a single source, such as the first sensor device 111a; a plurality of individual data sets from each of multiple sources, such as the first camera device 11a, the second camera device 111b; a combination thereof; etc., may also be used.

The plurality of data sets of sensor information may then be averaged to provide an averaged synchronized data set. Averaging may be accomplished as the recordings are acquired ("on the fly") or the multiple recordings may be saved for subsequent averaging. In some embodiments, only a portion or subset of the plurality of data sets may be averaged. For example, some of the data sets but not others may be averaged. As another example, a portion of the content of each data set of the plurality of data sets, i.e., a subset of data/information with data sets may be averaged. Combinations of these embodiments may also be used. In some embodiments, averaging may comprise averaging light intensity exhibited by one or more pixels in a series of digital video frames such that modulation of the light intensity is observed in a consistent pixel or set of pixels, frame-to-frame.

It will be understood that averaging is typically avoided for high quality video and motion detection. In fact, averaging is known to ruin video data—for example, if there is no repetitive motion, or if the motion is not synchronized, averaging will result only in loss of information. Motion will literally average out and become undetectable. Further, averaging in such situations will ruin video quality—again, detail is averaged out. Thus, conventional methods rely on increasing hardware capability and sensitivity to arrive at improved signal to noise and improved motion detection. Using such an approach, higher and higher quality video capture is needed. Conversely, the disclosed systems and methods leverage the motion/vibration's repetitive nature.

Alternatively, in an embodiment, the data sets of sensor information may first be processed using conventional processing means. For example, processing may include extraction of data from the data sets of sensor information, including extraction of displacement data and other information. Such data may be extracted on a pixel by pixel basis as would be known in the art. Processing may be performed "on the fly" as the data sets of sensor information are captured, or the data sets of sensor information may be stored for later processing. The plurality of processed data sets of sensor information may then be averaged to provide an averaged synchronized data set.

The averaged synchronized data set may then be analyzed for vibration and other issues. Due to the synchronized nature of the multiple recordings, the signal to noise ratio will improve for movement to which the sensor system 110 is synchronized, thus lowering the noise floor and improving vibration detection. Thus, motion which is repetitive and/or occurs at the same point with respect to the dynamic event will be more readily detected and calculated. This analysis may be performed using conventional means. For example, the analysis may be similar to and/or include features of the processing discussed above.

Figure 5:
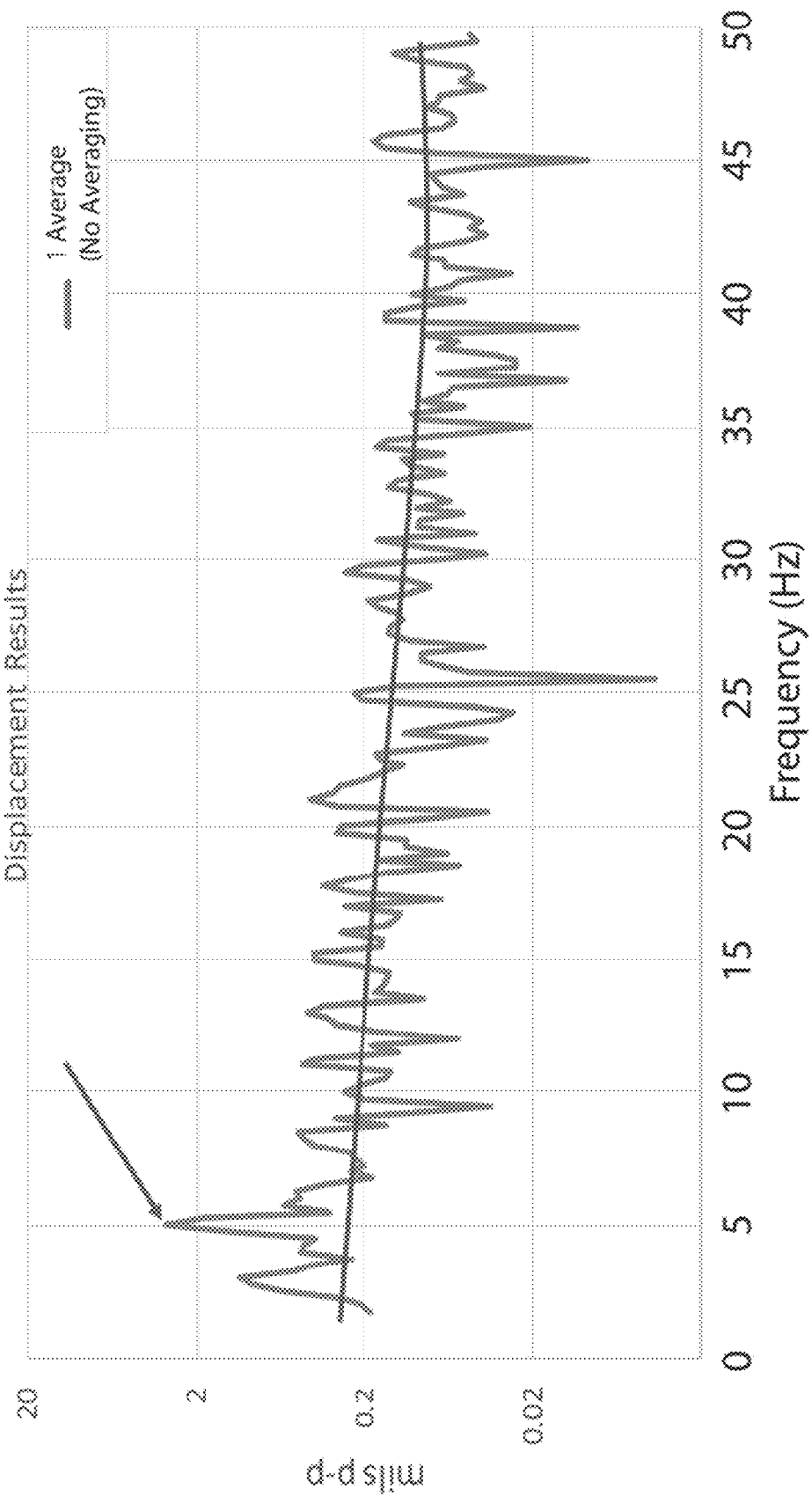
FIG. 5 depicts a graph of a representative analysis without averaging.
Figure 6:
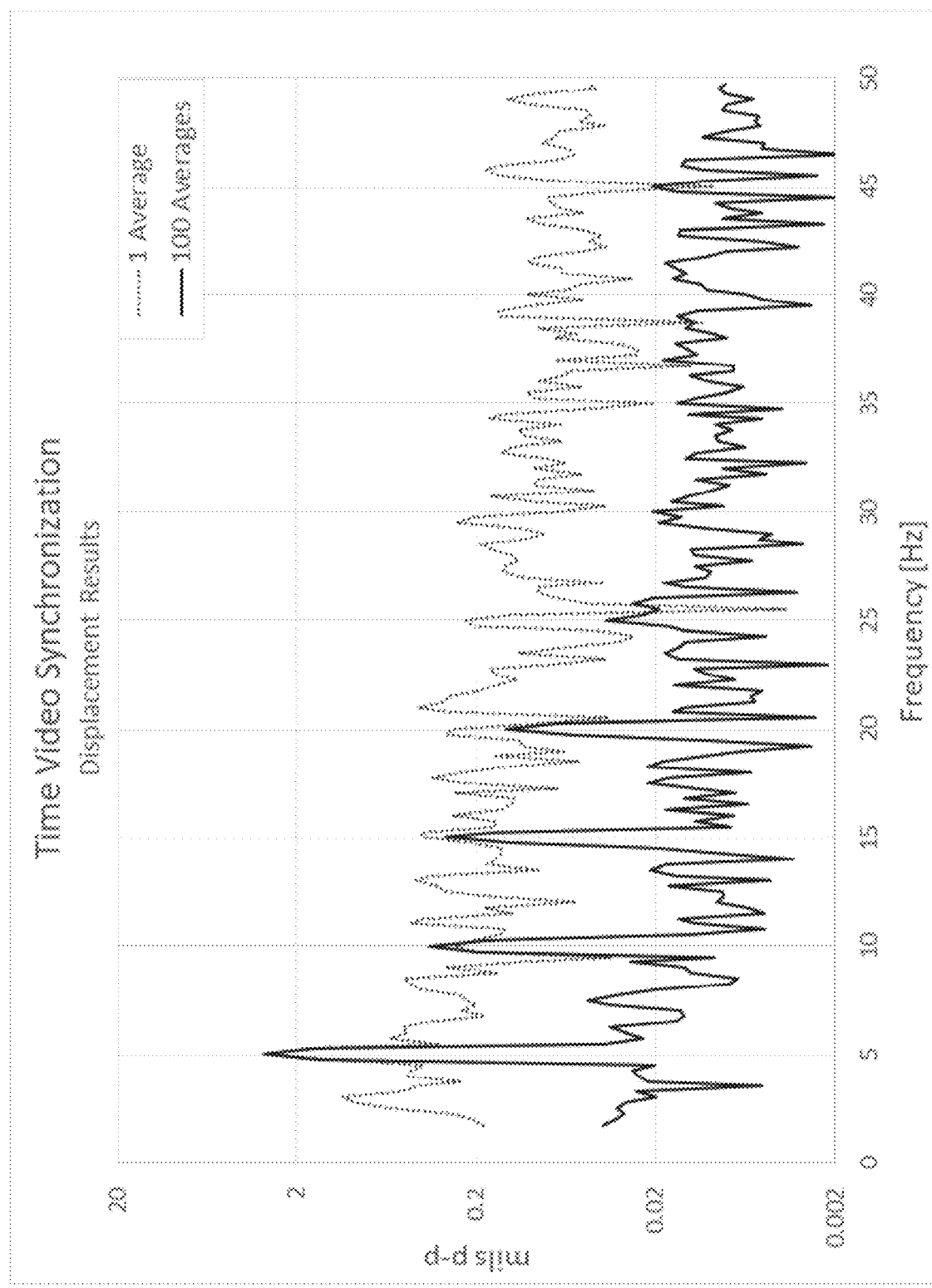
FIG. 6 depicts a graph showing the representative analysis without averaging according to FIG. 5 compared a representative analysis using time video synchronization and averaging in accordance with embodiments of the present invention.

The analysis may include calculating a motion of the object 101. In some embodiments, the motion may be an unexpected or undesired motion, for example, due to a defect, abnormality, or other issue. In some embodiments, the motion may be a displacement and displacement data for the averaged synchronized data set may be calculated. In an embodiment, such displacement data may be analyzed on a pixel by pixel basis as would be known in the art. Further, noise, a noise floor, and/or a signal to noise ratio may be calculated. The analysis may also include graphing, for example graphing the calculated displacement data, noise, and/or noise floor as is shown in FIGS. 5 and 6 discussed below.

The analysis may also include the creation/generation of video representations showing the detected motion. Altered, enhanced, modified, and/or magnified videos may also be used, either as part of the initial creation/generation or by further processing. For example, displacement and/or motion may be increased, scaled, magnified, amplified, or otherwise changed so that the displacement and/or motion is more noticeable.

Further, the processes described herein may be applied over time, for example, by capturing relatively long data sets or by continuously averaging data sets over relatively long periods of time. The processes may also be performed continuously, with existing data sets continuously replaced as new data are captured and averaged. Such embodiments may make use of various time windows for which captured data is saved and averaged before being replaced. Thus, it will be understood that improved condition monitoring over time may be realized using embodiments of the invention. As discussed above, any deviation from long term averages or from a baseline or threshold, may be detected and may trigger further action.

Figure 2:
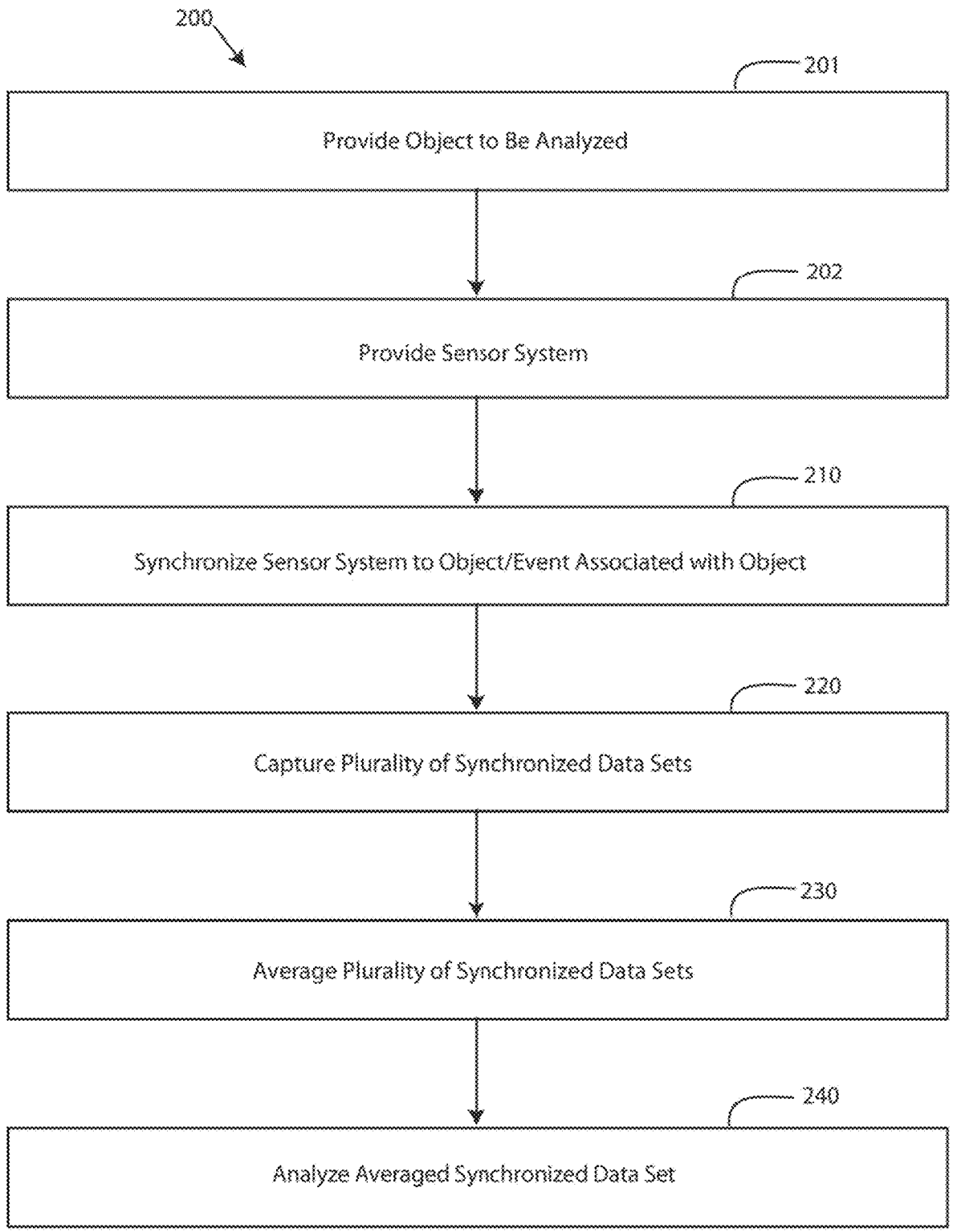
FIG. 2 depicts a flow chart of a method for detection and analysis of motion in accordance with embodiments of the present invention.

FIG. 2 depicts a flow chart of a method 200 for detection and analysis of motion, in accordance with embodiments of the present invention. Embodiments of the method 200 for detection and analysis of motion may begin at step 201, wherein an object to be analyzed is provided, such as object 101. In step 202, a sensor system, such as the sensor system 110, is provided. As discussed above, the sensor system may comprise at least one sensor device, such as the at least one sensor device 111. In some embodiments, steps 201 and 202 may not be required, and the method may begin with step 210.

In step 210, the sensor system, and or the at least one sensor device, is synchronized to the object or to a dynamic event associated with the object. As discussed above, the dynamic event may be a rotational motion, other type of motion, or other event. For example, in another embodiment the dynamic event may be an impulse applied to the object. Synchronization may be achieved by a variety of means, including tachometer, key phasor, proximity probe, accelerometer, laser vibrometer, optical synchronization, sensor timing/frame rate, and other means. In some embodiments, synchronization may be achieved using a processor of the sensor system, such as the processor 112.

In step 220, a plurality of data sets are captured by the sensor system and/or the at least one sensor device. As discussed above, the plurality of data sets may be, for example, a plurality of video sequences. The plurality of video sequences may each comprise any number of frames or images. Each of the plurality of video sequences may be synchronized individually, or may be synchronized as a group of frames which are individually initiated, for example, by an internal clock of the camera. In some embodiments, capture of the plurality of data sets may be achieved using a processor of the sensor system, such as the processor 112.

In step 230, the plurality of data sets are averaged to provide an averaged synchronized sequence. Averaging may include synchronous time averaging or synchronous frequency averaging. As discussed above, averaging may be done either on the fly or after capture or after additional processing. In some embodiments, averaging of the plurality of data sets may be performed using a processor of the sensor system, such as the processor 112.

In step 240, analysis may be performed on the averaged synchronized data set. Because the averaged synchronized sequence will have a higher signal to noise ratio, the averaged synchronized data set may enable better analysis of any unwanted or unexpected motion. The analysis may determine or show unwanted vibration, movement, or other information with respect to the object to be examined, for example, a motion of the object. In some embodiments, analysis of the averaged synchronized data set may be performed using a processor of the sensor system, such as the processor 112.

Figure 3:
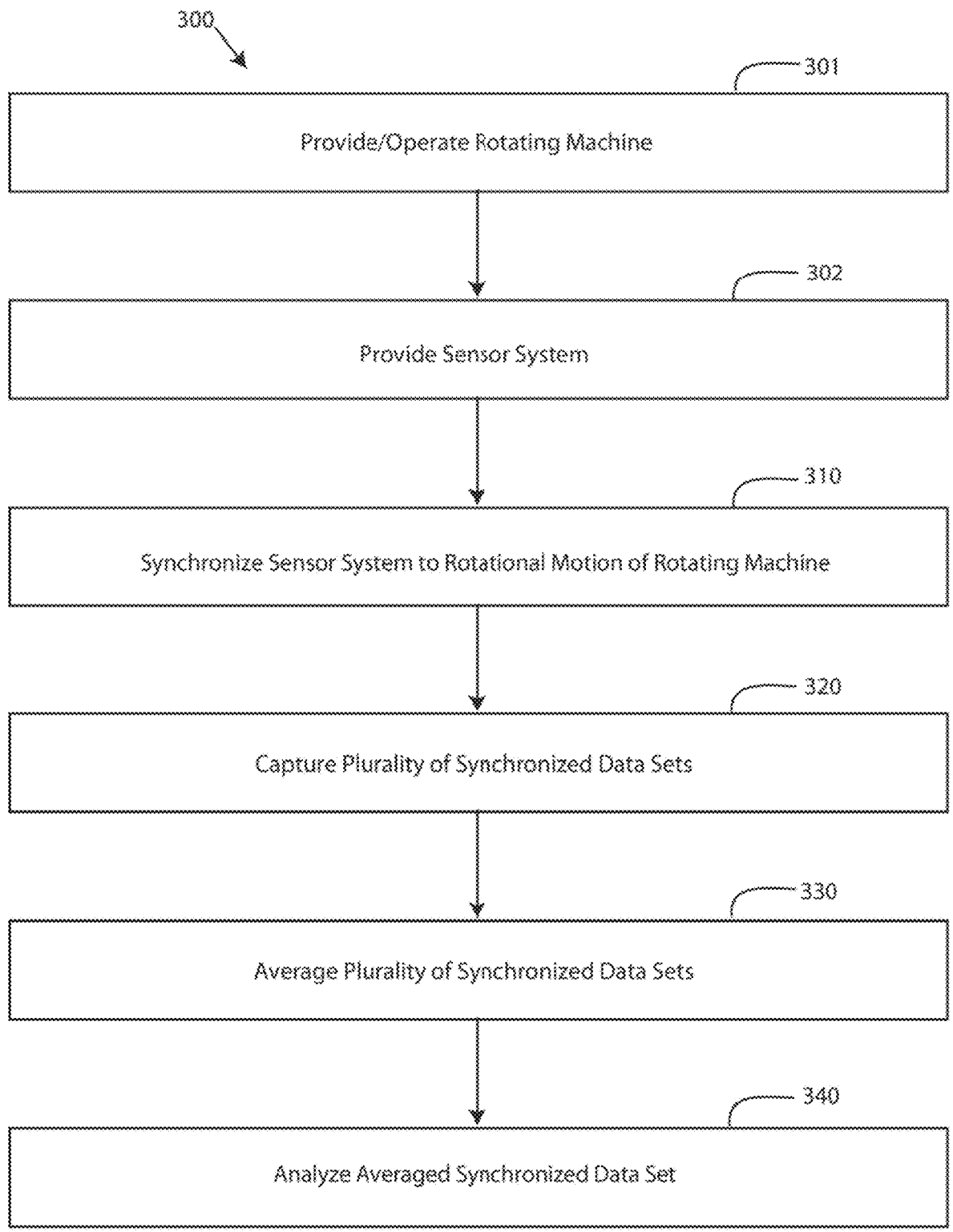
FIG. 3 depicts a flow chart of a method for detection and analysis of motion in accordance with additional embodiments of the present invention.

FIG. 3 depicts a flow chart of a method 300 for detection and analysis of motion, in accordance with embodiments of the present invention. Method 300 is similar to method 200 and depicts specific application to detection of vibration or motion with respect to a rotating machine using a camera system. Specific details of method 200 may be applied to method 300 and vice versa.

Embodiments of the method 300 may begin with optional step 301, wherein the rotating machine is provided and/or operated, and optional step 302, wherein a sensor system comprising a camera system, such as the sensor system 110, is provided. In alternative embodiments, steps 301 and 302 may not be required, and method 300 may begin with step 310.

In step 310, the sensor system/camera system is synchronized to the rotating machine. The sensor system/camera system may be synchronized to the normal rotation of the rotating machine. For example, in one embodiment, the camera system may be synchronized to the rotating machine using the known description of a clock face for rotating machines. Thus, the sensor system/camera system may be synchronized to initiate data capture at the beginning of a rotation, e.g., a 12 o'clock position. Alternatively, the sensor system/camera system may be synchronized to initiate data capture at any other selected position.

In step 320, a plurality of data sets are captured by the camera system/sensor system. The plurality of data sets may be, for example, a plurality of video sequences. The plurality of data sets may each begin at a specific selected position in the rotation of the rotating machine or may otherwise be synchronized based on the synchronization from step 310. Further, if desired, the plurality of data sets may each comprise an identical duration or frame length. Alternatively, different durations and frame lengths may be used. In some embodiments, individual frames may be synchronized, or groups of frames may be synchronized.

In step 330, the plurality of data sets are averaged to provide an averaged synchronized data set, for example, an averaged video sequence. Averaging may include synchronous time averaging or synchronous frequency averaging. The averaged synchronized data set may have a higher signal to noise ratio as will be discussed in more detail. Further, the averaged synchronized data set may more clearly show vibration or other motion, such as a motion of the object, and may more clearly distinguish such vibration or other motion from noise.

In step 340, analysis may be performed on the averaged synchronized data set. Because the averaged synchronized data set will have a higher signal to noise ratio, the averaged synchronized data set may enable better analysis. The analysis may show unwanted vibration, movement, or other information with respect to the rotating machine, for example, a motion of the rotating machine. It may also confirm absence of unwanted or excess vibration in a healthy machine, aiding in a "wellness evaluation" of the machine. The averaged synchronized data set may have a higher signal to noise ratio as will be discussed in more detail. Further, the averaged synchronized data set may more clearly show vibration or other motion, such as a motion of the rotating machine, and may more clearly distinguish such vibration or other motion from noise.

Either or both of methods 200 and 300 may include creating or outputting a video representing the calculated motion, particularly using the analyzed averaged synchronized data set or data therefrom. The created or outputted video may more clearly show vibration or other motion and more clearly distinguish such vibration or other motion from noise as discussed above. Further, in some embodiments, additional processing or editing may be performed on the video. For example, the calculated motion may be magnified, amplified, or otherwise altered to more clearly show the detected/calculated motion/vibration. For example, movement may be increased, scaled, magnified, amplified, exaggerated, or otherwise changed so that the movement is more noticeable. This may be performed during the creation of the video representation, or may be performed separately, i.e., after creation of the video.

Likewise, either or both of methods 200 and 300 may be performed over a relatively long duration of time, either continuously or with respect to a time window. Thus, it will be understood that improved condition monitoring over time may be realized using embodiments of the methods.

Aspects of the present invention are described herein with reference to the flowchart illustrations. It will be understood that each block of the flowchart illustrations can be implemented by computer-readable program instructions.

Having broadly described embodiments of the system and method, synchronous time averaging will now be described in further technical detail.

Using synchronous time averaging, persistent parameters of the object or a system being measured, even if of a very low level, may be determined by the statistical averaging of a signal, the timing of which is always synchronized with a physically correlated event. Any noise present is statistically diminished in a manner that is typically proportional to the square root of the number of samples taken and averaged.

Synchronous time averaging includes recording a given parameter of an object, such as amplitude of oscillation or the level of intensity of light in a camera pixel, at a series of discrete consecutive moments in time within a segment of time. For example, as discussed above, multiple data sets of sensor information are captured. Synchronous time averaging then determines what consistently persists by considering a number of these time segments/data sets. Due to the synchronization of the sensor to the dynamic event associated with the object as discussed above, the beginning of each time segment of data is initiated by the synchronized dynamic event (with or without intentional advance or delay, such as provided for example by zero padding). For example, the physical event/motion may serve as a "trigger"

for acquiring data in each time segment. Depending upon the data acquisition rate of the sensor (e.g. the frame rate of a video camera), the acquired parameters within any given time segment are recorded at discrete moments in time, forming a digital series of parameter value versus time expended since the beginning of the time segment.

Synchronous time averaging may then add parameter values (e.g. intensity of a particular pixel) for each moment (e.g. each camera frame) in a given time segment or data set, so the measured parameters at a time point from beginning of each segment (e.g. 10 milliseconds from "trigger") are added for all segments. To normalize the parameter value (e.g. light intensity of a camera pixel) independent of the total number of segments, synchronous time averaging may then divide the measured parameters by the number of segments, although this step may be applied later, as a dimensional scaling factor for example. As an example of the normalization process, for a steady state oscillation that is randomly sampled, the synchronous averaging process results in an arithmetically averaged set of data, such that for X time segments of averaged data, the average value of the sampled parameter P, called Pavg, is the total sum of P values for each of the time segments, divided by X.

In various forms of dynamic signal averaging other than synchronous averaging, the sampling of the signal is not synchronized with the phase (i.e. timing) of the signal being sampled. In other words, when a signal is oscillating up and down about some mean, at any given moment at which a measurement is made, the signal has as much probability of being "up" (greater) versus being "down" (lesser) relative to its mean value. Therefore, the average of all signals not synchronous with the start of the time segments will decay statistically toward the mean value, representing zero oscillation. On the other hand, all signal oscillations that are synchronous with the timing of the time segment acquisition will have their detected amplitudes statistically reinforced on average, because the periodic "ups and downs" of the signal oscillation at each frequency will always be synchronized with the physically correlated start of the data acquisition period. As discussed above, synchronous time averaging thus increases the signal to noise ratio and reduces the noise floor, facilitating improved detection of vibration, etc.

In an alternative embodiment of synchronous averaging that converts time into frequency before the synchronous averaging, a segment of time is recorded, with multiple samples taken during that time interval, and is then processed to determine the signal frequency characteristics during that time interval. For example, based on a time segment of length T, there may be X instantaneous samples of signal value, taken each consecutive time point (starting from zero) in steps of T/X. Using this information, a Fourier Transform (e.g. a Fast Fourier Transform, or FFT) may be performed to determine the estimate of the frequency spectrum of the signal (a plot of signal versus frequency), with a resolution of delta-f=1/T, and a frequency range from zero to X/T.

In this alternative procedure, the signal processing is then performed in the "frequency domain" (considering signal versus frequency instead of signal versus time), such that multiple time segments are each first converted to a frequency spectrum using FFT, and then the FFT results for each segment are added and divided by X. In such an instance, the process is known as "frequency averaging", or "spectrum averaging". In frequency averaging, any parameter that has consistent frequency content (e.g. a significant amount of absolute value of signal at any given frequency within the FFT's frequency span) will be reinforced as more and more segments are included in the sample. This gradually converges on the parameter's typical, i.e. arithmetically averaged, value as more segments are taken. A disadvantage of this technique is that any noise which is consistently present tends to persist in spite of the averaging process.

The retention of noise in frequency averaging can be reduced by synchronizing the timing of the beginning of each time segment with the signal that is the target of the sampling, similar to synchronous time averaging, and then separately averaging the resulting "real" and the orthogonal "imaginary" components of the signal. This preserves the phase (timing) relationship of the signal to whatever initiates the acquisition of the time segments. This is known as synchronous frequency averaging, and while more complex and therefore more computationally intensive, can be implemented in a manner that noise is reduced to nearly the same degree as is accomplished by synchronous time averaging. Therefore, synchronous frequency averaging is another embodiment of the disclosed technique.

Turning to FIGS. 4A-4D, various averaging approaches, or lack thereof, are discussed. In this example, an input signal is a two-tone signal in which the dominant tone is a 10 kHz sine wave with an amplitude of 1 Vp and the smaller component is a 15 kHz sine wave with an amplitude of 0.01 Vp. Noise is also present in the signal. The signal is sampled at 51.2 kHz in blocks of 1,000 samples and, where averaging is used, the Figures use the results of 100 averages.

Figure 4A:
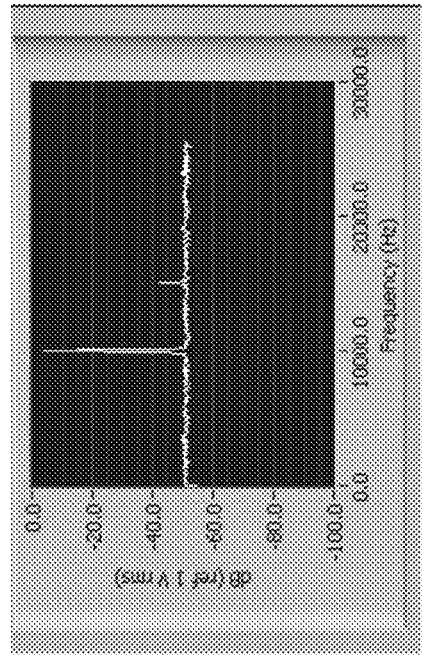
FIG. 4A depicts a representative analysis using no averaging.
Figure 4B:
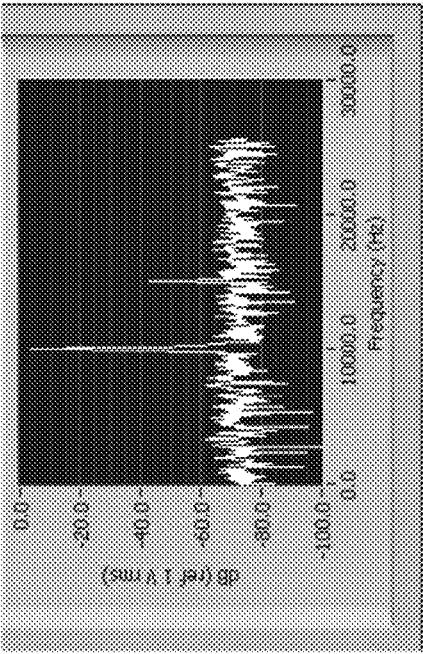
FIG. 4B depicts a representative analysis using RMS averaging.
Figure 4C:
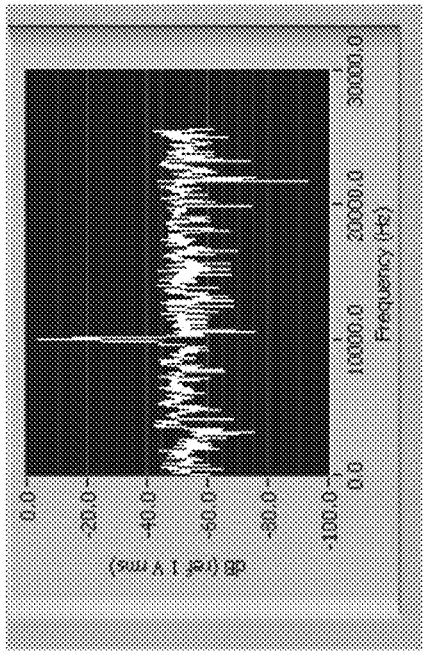
FIG. 4C depicts a representative analysis using vector averaging.

As shown in FIG. 4A, only the dominant tone is identified when no averaging is performed. As shown in FIG. 4B, Root Mean Square (RMS) averaging may smooth out some of the noise but does not reduce the noise floor. Thus, the smaller component tone at 15 kHz is not likely to be detected. As shown in FIG. 4C, Vector Averaging (non-synchronous frequency averaging) underestimates the dominant tone at 10 kHz. Further, the smaller tone at 15 kHz is indistinguishable from the noise. Thus, all of these methods fail to properly distinguish both the dominant and smaller tone from the noise and fail to reliably detect these signals.

Figure 4D:
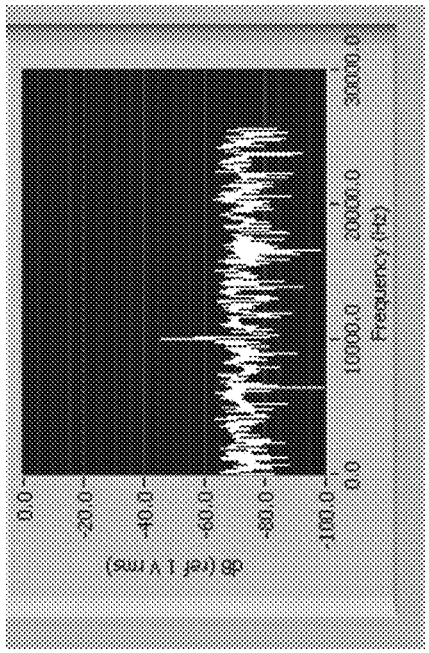
FIG. 4D depicts a representative analysis using synchronous averaging.

Turning to FIG. 4D, synchronous time averaging accurately computes the energy of the tones, reduces the noise floor by 20 dB, and reveals both the dominant tone at 10 kHz and the smaller tone at 15 kHz. The 20 dB reduction in the noise floor corresponds to a factor of 10 in level, or 100 in total acquisition time, where 100 is the number of averages completed. The reduction in the noise floor may be attributed to the synchronization of the captured data. Because the noise is inherently random, the average noise amplitude at any frequency should decay as additional samples are captured and averaged. As demonstrated above, when 100 averages are used the noise floor may be expected to be reduced by a factor of 10.

Exemplary applications of the disclosed time video synchronization system 100 configured to implement embodiments of the present invention are now described with respect to FIGS. 5-6. These examples show data extracted from video of an object (a shaker square placed on a pair of weights with a wall in the background) oscillating at 5 Hz. Additional settings include 2500 Gain and 2 Width. The camera frame acquisition is synced to the 5 Hz motion. The same video capture settings and processing methods are used for both FIGS. 5 and 6, with the only difference being the number of data sets captured and whether averaging of multiple data sets is used.

FIG. 5 shows an example of displacement data extracted from a single data set, i.e., a single video file using the described settings, and then graphed. As can be seen, the graphed data set shows a displacement peak of over 2 mils at 5 Hz; however, the noise floor is around 0.2 mils. Further, there are no detectable displacement peaks at 10 Hz or the additional harmonic frequencies.

FIG. 6 uses the same experiment settings, but also applies the disclosed methods and systems. Displacement data is then extracted, for example, with 100 averages. As can be seen, the noise floor is reduced to under 0.02 (as discussed above, reduction is by a factor of 10 for 100 averages) and the displacement peaks at the harmonic frequencies of 10 Hz, 15 Hz, and 20 Hz are now clearly shown. As discussed above, the detection of vibration/motion at these harmonic frequencies may be used to detect and/or diagnose conditions of the object, such as operating conditions, faults, etc.

FIG. 6 demonstrates the disclosed systems and methods ability to reduce the noise floor while preserving motion detection, improve signal to noise ratio, and enable improved motion analysis. Additional examples further demonstrating these benefits will be discussed in more detail below.

As discussed above, the plurality of data sets captured by the sensor system/at least one sensor and/or the averaged synchronized data set may be processed to provide extracted data, for example, the data shown in FIGS. 5 and 6. Such data may also be used to prepare video representations of the data, for example, videos representing the movement/displacement at a respective frequency. As discussed in more detail below, in some embodiments, videos representing the movement/displacement may be edited to emphasize or exaggerate the movement/displacement.

FIGS. 7A-14D show frames of such video representations prepared from the same data used to prepare FIGS. 5 and 6. The shaker square, pair of weights, and background wall discussed in FIGS. 5 and 6 are seen in each of these Figures. Figures designated as "A" (7A, 8A, 9A, etc.) represent a frame showing a midpoint of the shaker motion. Figures designated as "B" (7B, 8B, 9B, etc.) represent a frame showing a bottom point of the shaker motion. Figures designated as "C" (7C, 8C, 9C, etc.) represent a frame showing a midpoint again. Figures designated as "D" (7D, 8D, 9D, etc.) represent a frame showing a top point of the shaker motion. Thus, the entire shaker cycle of the shaker motion may be generally visualized.

Figure 7A:
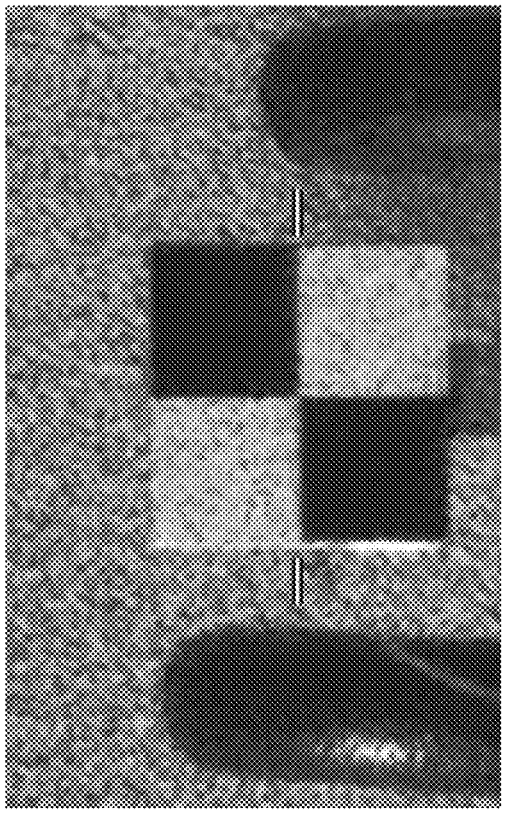
FIG. 7A shows a midpoint of calculated motion at the 5 Hz frequency using unaveraged data.

Further, the FIGS. 7A-14D show unaveraged and synchronously averaged data side by side. For example, as discussed below FIG. 7A is shown side by side with FIG. 8A, showing unaveraged data for a midpoint of shaker movement alongside synchronously averaged data for a midpoint of shaker movement. Likewise, FIG. 7B is shown side by side with FIG. 8B, showing unaveraged data for a bottom point of shaker movement alongside synchronously averaged data for a bottom point of shaker movement, FIG. 7C is shown side by side with FIG. 8C, showing unaveraged data for a second midpoint of shaker movement alongside synchronously averaged data for a second midpoint of shaker movement, and FIG. 7D is shown side by side with FIG. 8D, showing unaveraged data for a top point of shaker movement alongside synchronously averaged data for a top point of shaker movement. FIGS. 9A-9D and 10A-D are paired in the same manner, as are 11A-11D and 12A-12D, and 13A-13D, and 14A-14D, respectively.

Figure 7B:
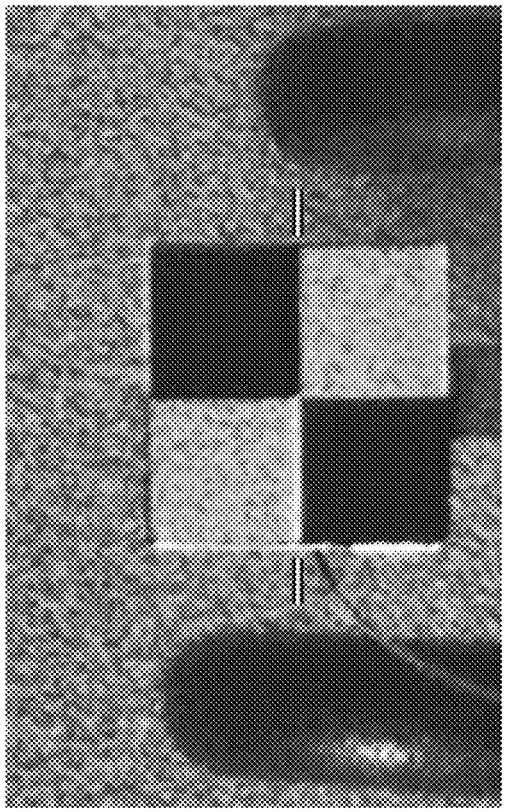
FIG. 7B shows a bottom point of calculated motion at the 5 Hz frequency using unaveraged data.
Figure 8A:
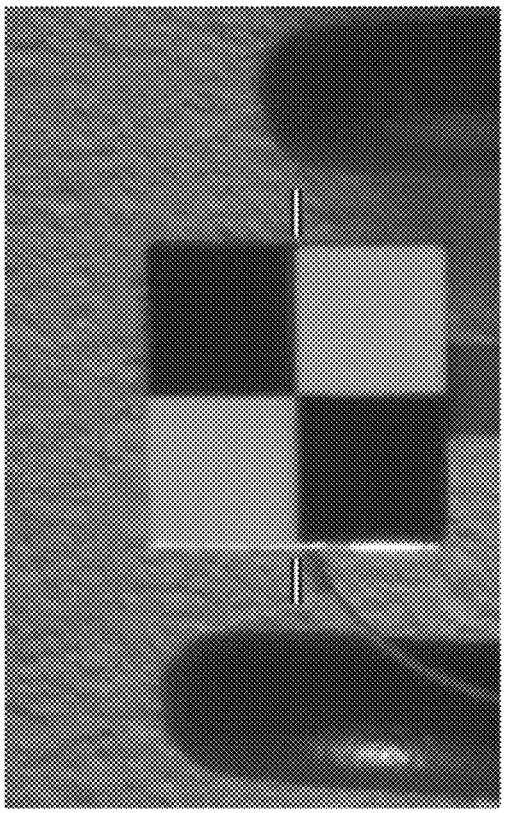
FIG. 8A shows a midpoint of calculated motion at the 5 Hz frequency using averaged data.
Figure 8B:
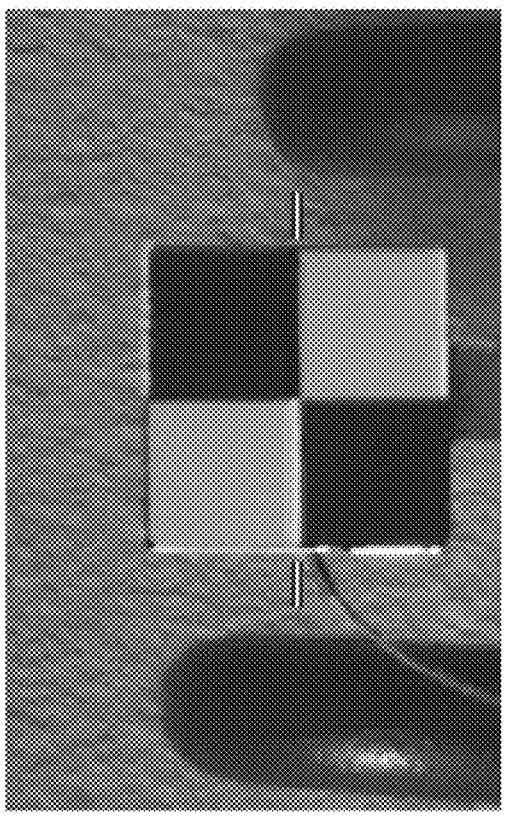
FIG. 8B shows a bottom point of calculated motion at the 5 Hz frequency using averaged data.
Figure 7C:
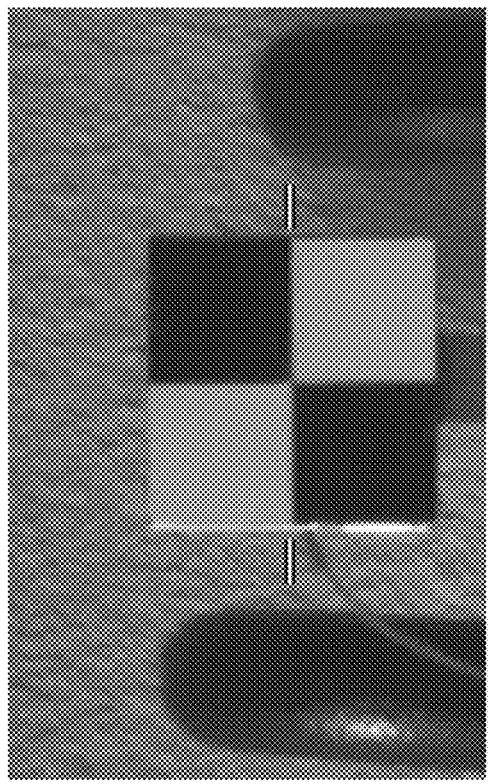
FIG. 7C shows a second midpoint of calculated motion at the 5 Hz frequency using unaveraged data.
Figure 8C:
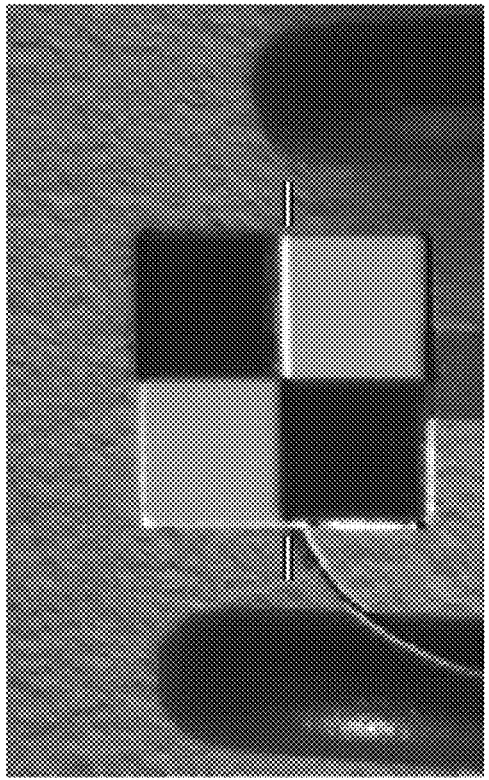
FIG. 8C shows a second midpoint of calculated motion at the 5 Hz frequency using averaged data.
Figure 7D:
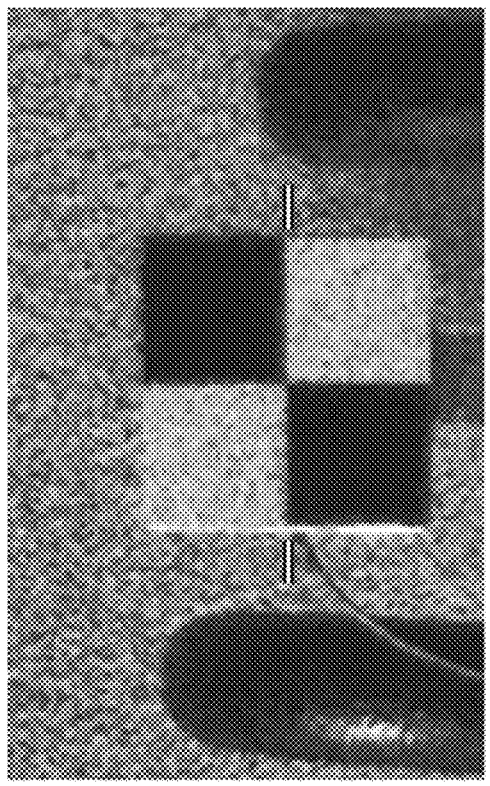
FIG. 7D shows a top point of calculated motion at the 5 Hz frequency using unaveraged data.
Figure 8D:
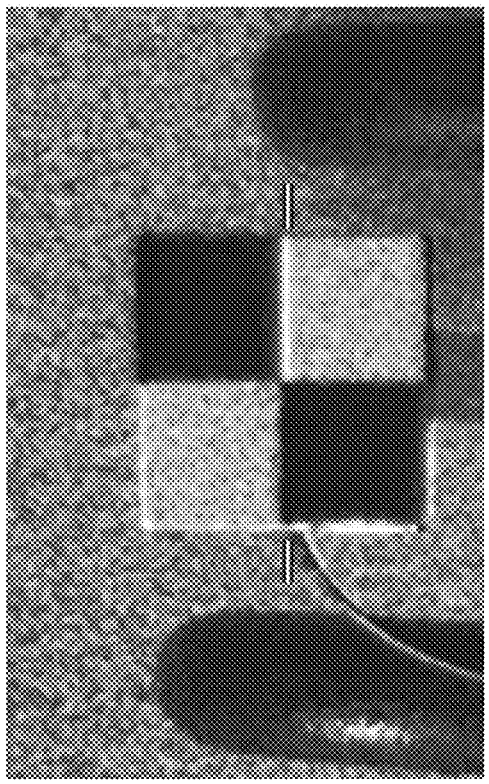
FIG. 8D shows a top point of calculated motion at the 5 Hz frequency using averaged data.
Figure 9A:
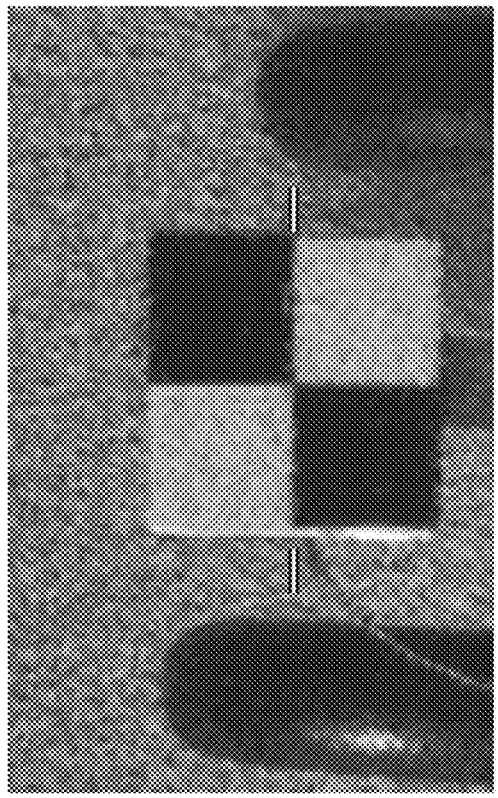
FIG. 9A shows a midpoint of calculated motion at the 10 Hz frequency using unaveraged data.
Figure 9B:
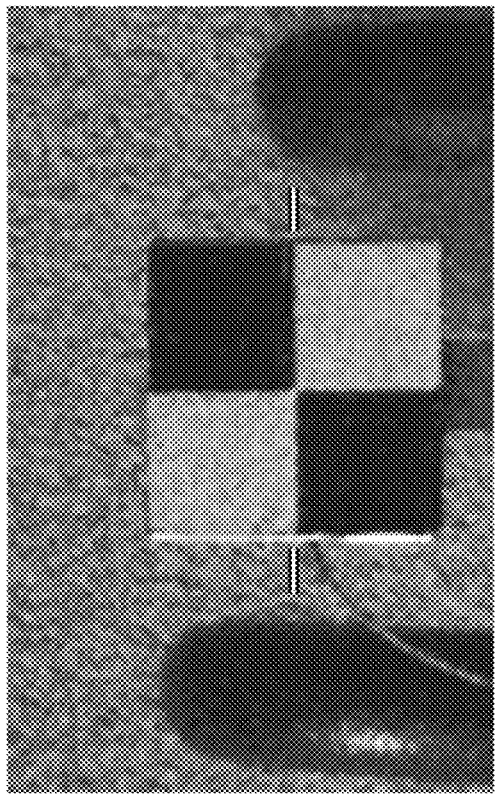
FIG. 9B shows a bottom point of calculated motion at the 10 Hz frequency using unaveraged data.
Figure 10A:
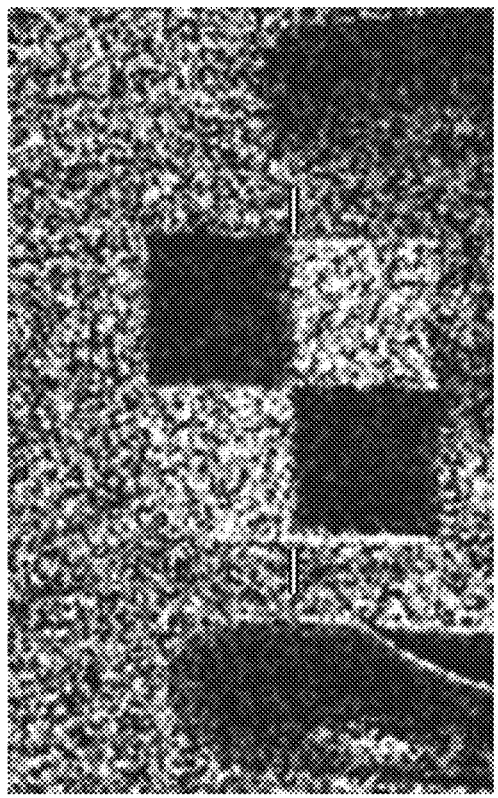
FIG. 10A shows a midpoint of calculated motion at the 10 Hz frequency using averaged data.
Figure 10B:
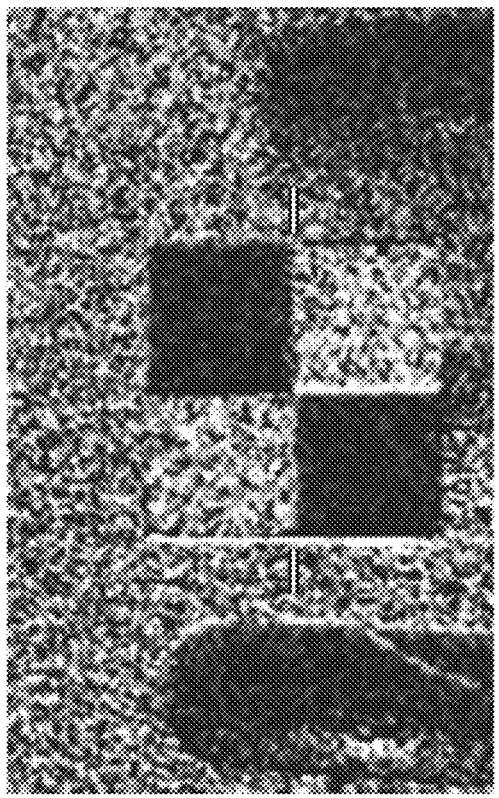
FIG. 10B shows a bottom point of calculated motion at the 10 Hz frequency using averaged data.
Figure 10C:
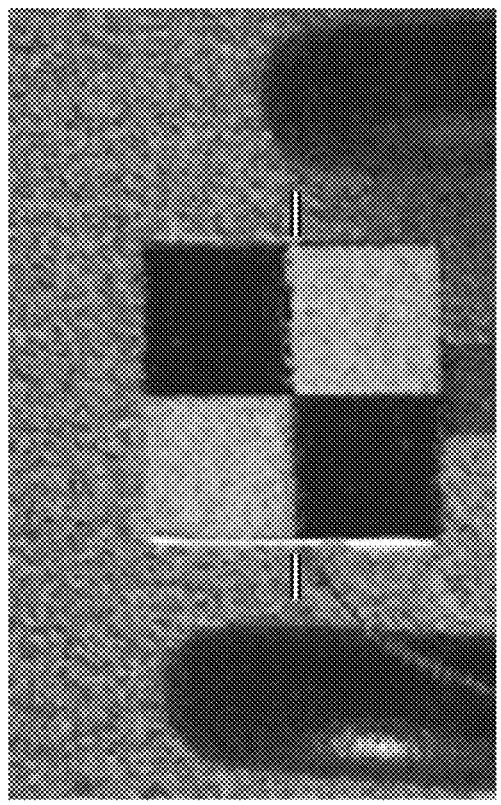
FIG. 10C shows a second midpoint of calculated motion at the 10 Hz frequency using averaged data.
Figure 10D:
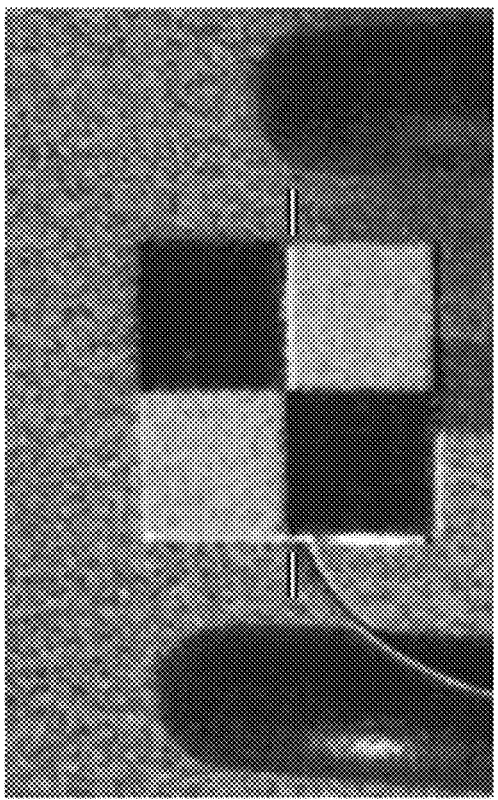
FIG. 10D shows a top point of calculated motion at the 10 Hz frequency using averaged data.
Figure 9C:
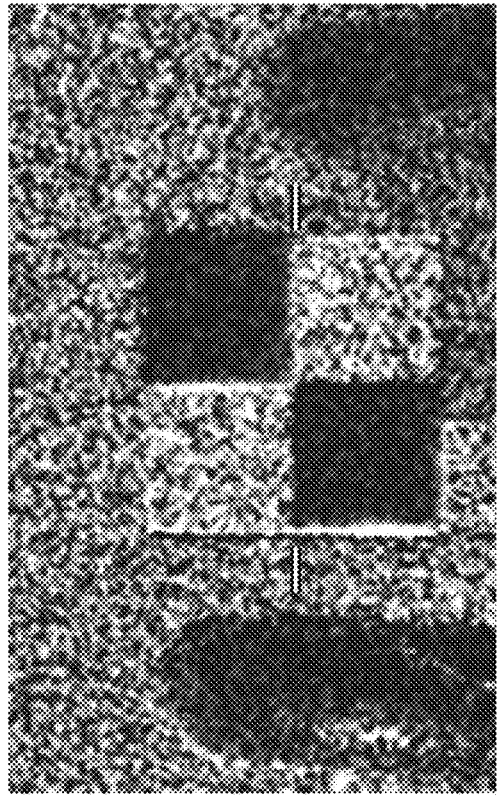
FIG. 9C shows a second midpoint of calculated motion at the 10 Hz frequency using unaveraged data.
Figure 9D:
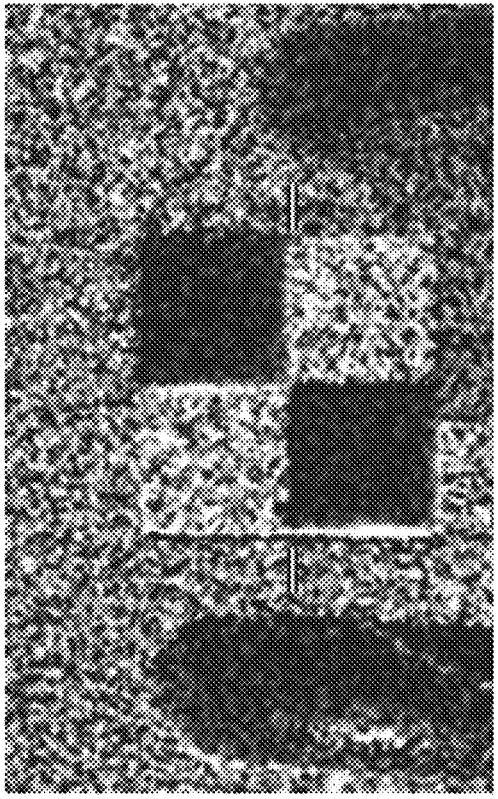
FIG. 9D shows a top point of calculated motion at the 10 Hz frequency using unaveraged data.
Figure 12C:
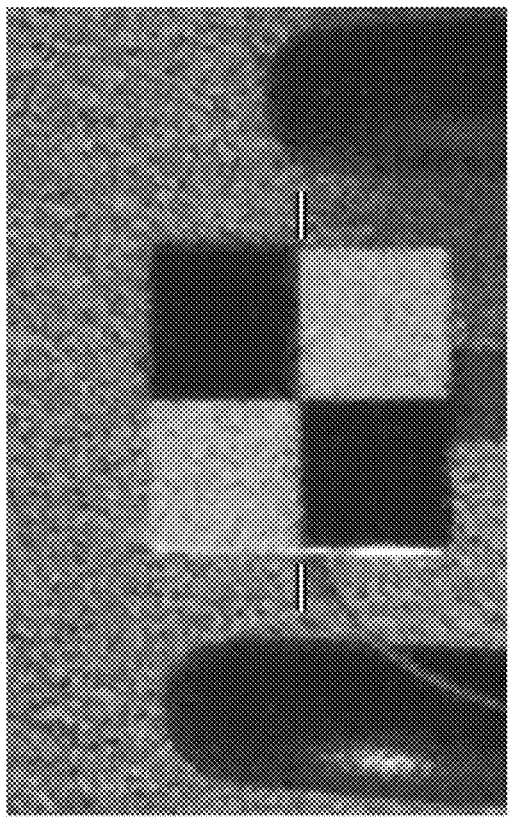
FIG. 12C shows a second midpoint of calculated motion at the 15 Hz frequency using averaged data.
Figure 12D:
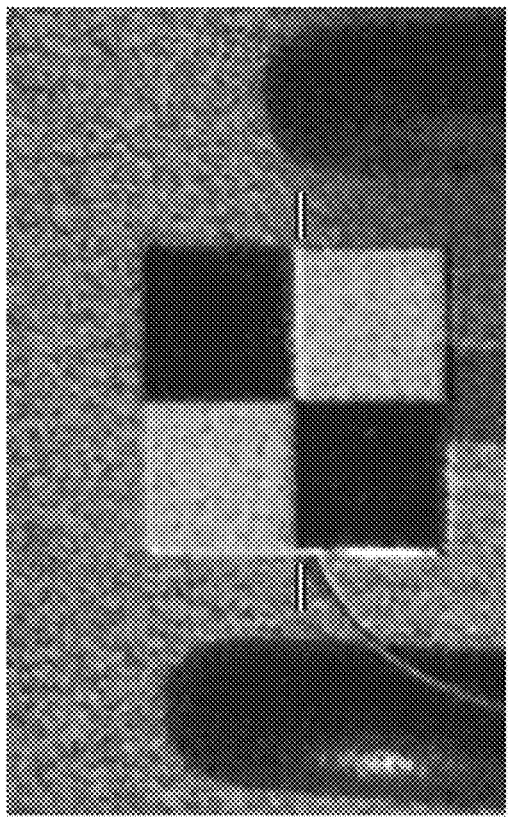
FIG. 12D shows a top point of calculated motion at the 15 Hz frequency using averaged data.
Figure 11C:
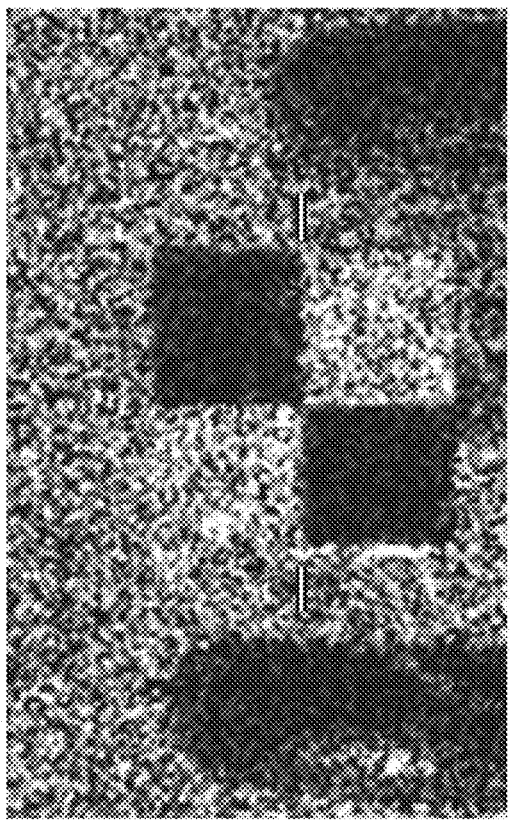
FIG. 11C shows a second midpoint of calculated motion at the 15 Hz frequency using unaveraged data.
Figure 11D:
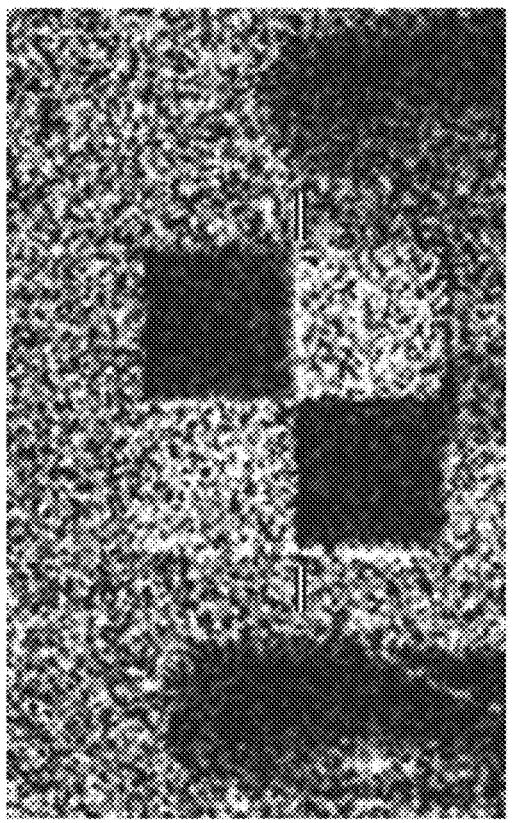
FIG. 11D shows a top point of calculated motion at the 15 Hz frequency using unaveraged data.
Figure 14A:
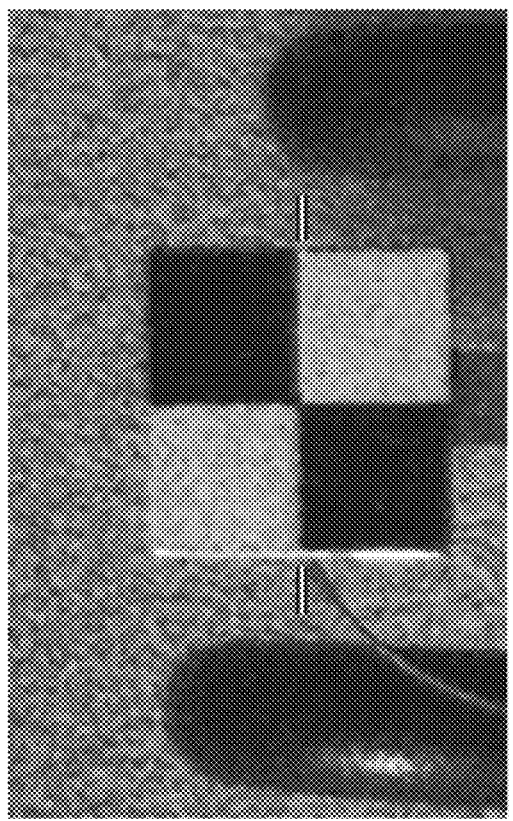
FIG. 14A shows a midpoint of calculated motion at the 20 Hz frequency using averaged data.
Figure 14B:
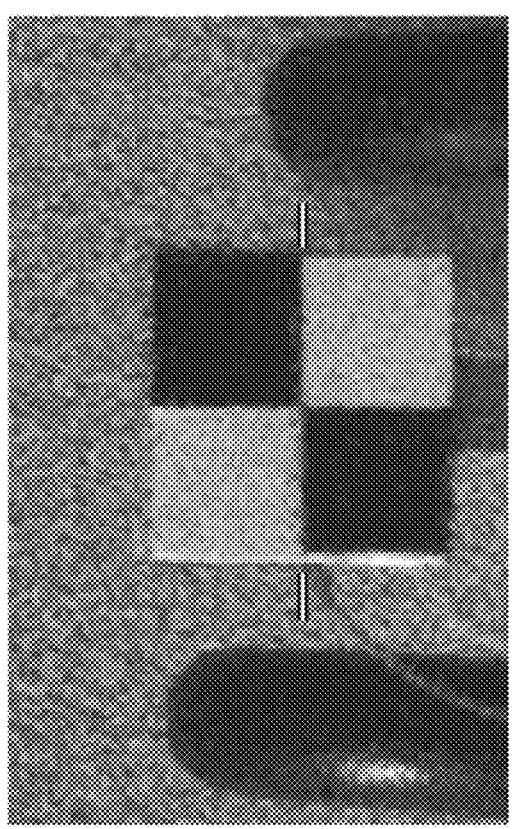
FIG. 14B shows a bottom point of calculated motion at the 20 Hz frequency using averaged data.
Figure 13A:
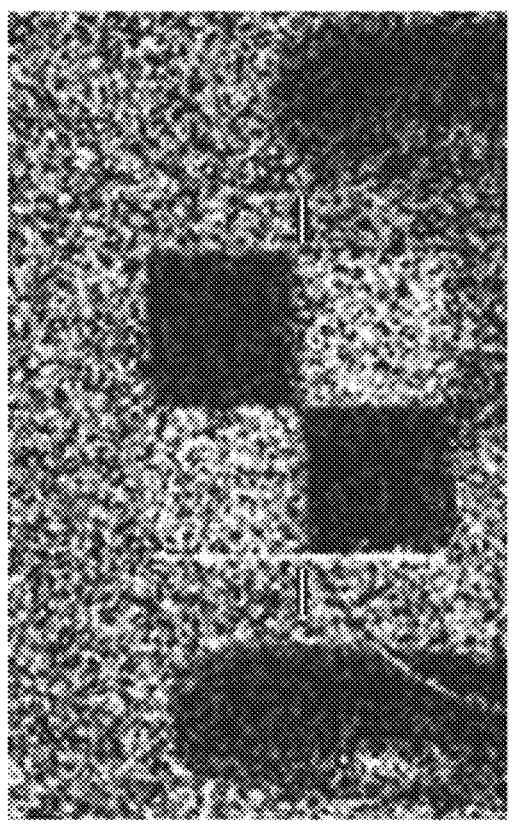
FIG. 13A shows a midpoint of calculated motion at the 20 Hz frequency using unaveraged data.
Figure 13B:
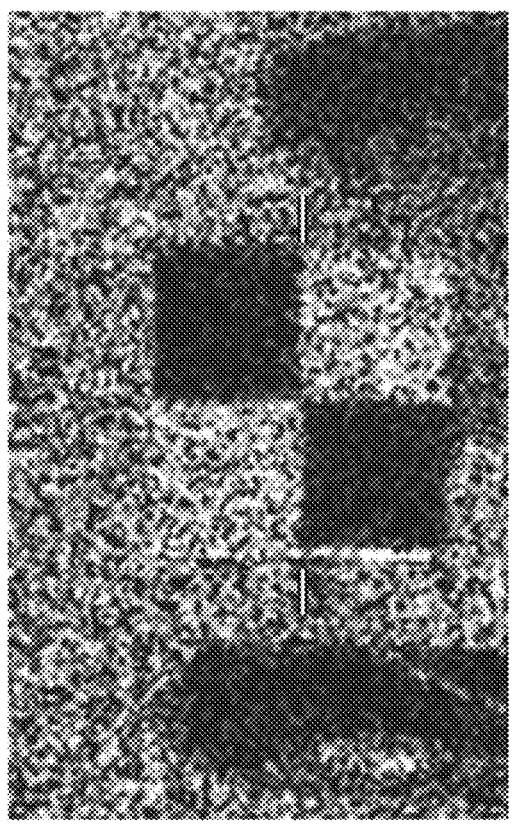
FIG. 13B shows a bottom point of calculated motion at the 20 Hz frequency using unaveraged data.

For example, FIGS. 7A-7D show calculated motion at the 5 Hz frequency using unaveraged data. FIG. 7A shows a midpoint, FIG. 7B shows a bottom point, FIG. 7C shows a second midpoint, and FIG. 7D shows a top point of shaker motion. These Figures may be directly compared with FIGS. 8A-8D which show calculated motion at the 5 Hz frequency using synchronously averaged data (100 averages). FIG. 8A shows a midpoint, FIG. 8B shows a bottom point, FIG. 8C shows a second midpoint, and FIG. 8D shows a top point. As can be seen, FIGS. 7A-7D contain snow and blurriness as well as artificial motion of the pair of weights. FIGS. 8A-8D demonstrate greater clarity due to the reduced noise floor and the motion is clearly limited to the shaker square.

FIGS. 9A-9D show calculated motion at the 10 Hz frequency using unaveraged data. These Figures may be directly compared with FIGS. 10A-10D which show calculated motion at the 10 Hz frequency using synchronously averaged data (100 averages). FIGS. 9A-9D and 10A-10D show the same respective timing as FIGS. 7A-7D and 8A-8D, namely a midpoint, bottom point, second midpoint, and top point. Again, the video representation resulting from the use of the disclosed methods (FIGS. 10A-10D) results in clearer video, lower noise, and better visualization of the actual movement in the scene, namely, the displacement of the shaker square and the benefits are readily seen when the videos are compared.

FIGS. 11A-11D show calculated motion at the 15 Hz frequency using unaveraged data. These Figures may be directly compared with FIGS. 12A-12D which show calculated motion at the 15 Hz frequency using synchronously averaged data (100 averages). FIGS. 11A-11D and 12A-12D show the same respective timing discussed above, namely a midpoint, bottom point, second midpoint, and top point. Again, the video representation resulting from the use of the disclosed methods (FIGS. 12A-12D) results in clearer video, lower noise, and better visualization of the actual movement in the scene, namely, the displacement of the shaker square and the benefits are readily seen when the videos are compared.

FIGS. 13A-13D show calculated motion at the 20 Hz frequency using unaveraged data. These Figures may be directly compared with FIGS. 14A-14D which show calculated motion at the 15 Hz frequency using synchronously averaged data (100 averages). FIGS. 13A-13D and 14A-14D show the same respective timing discussed above, namely a midpoint, bottom point, second midpoint, and top point. Again, the video representation resulting from the use of the disclosed methods (FIGS. 14A-14D) results in clearer video, lower noise, and better visualization of the actual movement in the scene, namely, the displacement of the shaker square and the benefits are readily seen when the videos are compared.

In an embodiment, the video representations may be magnified, amplified, or otherwise altered to more clearly show the detected motion/vibration. For example, the processor may increase, scale, magnify, amplify, exaggerate, or otherwise change the calculated displacement so that the motion is more noticeable. This may be performed during the creation of the video representation, or may be performed separately, i.e., after creation of the video.

FIGS. 15-22D depict an additional example using a motor driven pump and associated piping. Referring first to FIGS. 17A-22D generally, the motor driven pump and associated piping are shown. Both horizontal displacement and vertical displacement were evaluated using a single data set and using the disclosed system and method with 100 averages.

Figure 15:
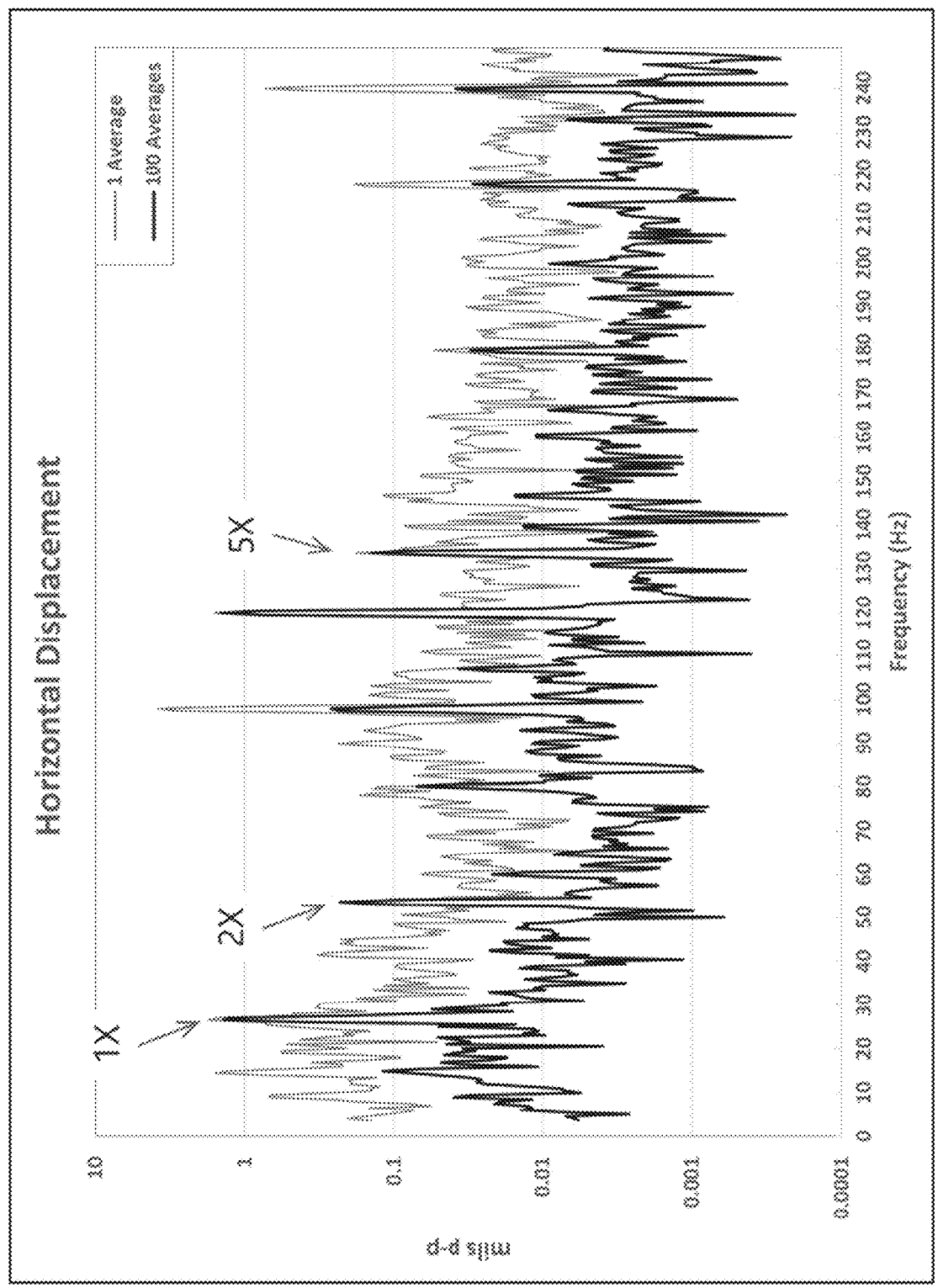
FIG. 15 depicts a graph showing horizontal displacement in a motor driven pump system both without averaging and with averaging in accordance with embodiments of the present invention.

FIG. 15 shows horizontal displacement. The light gray line shows displacement data extracted from a single data set and then graphed. As can be seen, the graphed data shows a displacement peak of over 1 mil at 26.7 Hz; however, the noise floor generally ranges between 0.01 and 0.1 mils. Further, peaks at 53.5 Hz and 133.5 are not distinguishable over the noise floor. The dark gray line shows displacement data according to the described methods and systems, for example, using 100 averages. As can be seen, the noise floor is reduced to a range between 0.001 and 0.01. Further, the peaks at 53.5 Hz and 133.5 are still present but are now easily distinguishable from the noise floor. As discussed above, the detection of vibration/motion at these harmonic frequencies may be used to detect and/or diagnose conditions of the object, such as operating conditions, faults, etc. For example, in this motor driven pump and piping system, the displacement at the running speed (1×) may be due to an imbalance, displacement at twice running speed (2×) may be due to a misalignment, and displacement at the vane pass frequency (5×) may indicate a natural frequency resonance condition.

Figure 16:
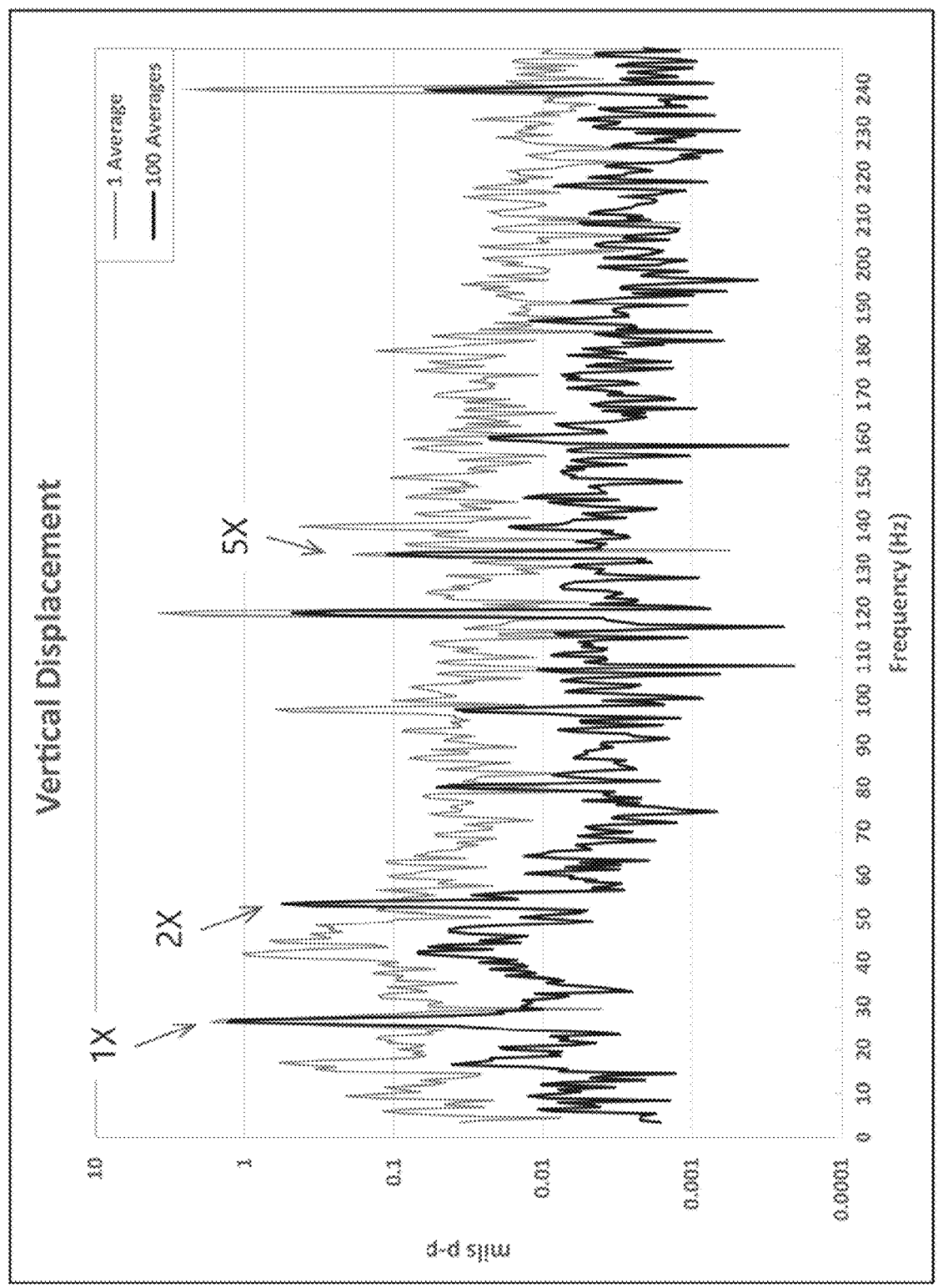
FIG. 16 depicts a graph showing vertical displacement in a motor driven pump system both without averaging and with averaging in accordance with embodiments of the present invention.

FIG. 16 shows vertical displacement. The light gray line shows displacement data extracted from a single data set and then graphed. As can be seen, the graphed data shows a displacement peak of over 1 mil at 26.7 Hz; however, the noise floor generally ranges between 0.01 and 0.1 mils. Further, peaks at 53.5 Hz and 133.5 are not distinguishable over the noise floor. The dark gray line shows displacement data according to the described methods and systems, for example, using 100 averages. As can be seen, the noise floor is reduced to a range between 0.001 and 0.01. Further, the peaks at 53.5 Hz and 133.5 are still present but are now easily distinguishable from the noise floor. As discussed above, the detection of vibration/motion at these harmonic frequencies may be used to detect and/or diagnose conditions of the object, such as operating conditions, faults, etc. For example, in this motor driven pump and piping system, the displacement at the running speed (1×) may be due to an imbalance, displacement at twice running speed (2×) may be due to a misalignment, and displacement at the vane pass frequency (5×) may indicate a natural frequency resonance condition.

As discussed above, the plurality of data sets captured by the sensor system/at least one sensor and/or the averaged synchronized data set may be processed to provide extracted data, for example, the data shown in FIGS. 15 and 16. Such data may also be used to prepare video representations of the data, for example, videos representing the movement/displacement at a respective frequency. As discussed in more detail below, in some embodiments, videos representing the movement/displacement may be edited to emphasize or exaggerate the movement/displacement.

FIGS. 17A-22D show frames of such video representations prepared from the same data used for FIGS. 15 and 16. FIGS. 17A-22D follow a similar pattern as FIGS. 7A-14D above.

Figure 17A:
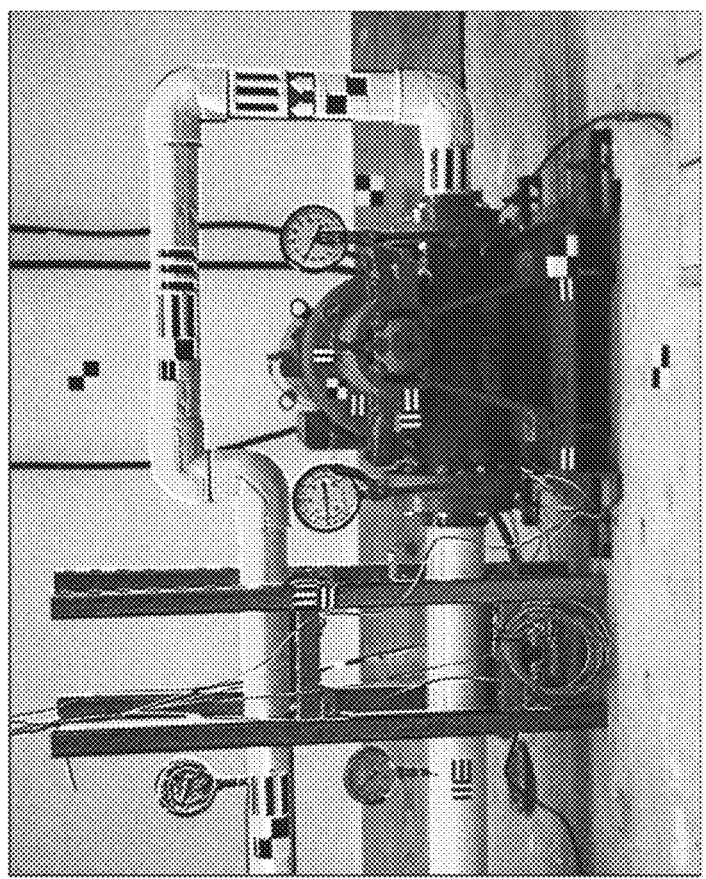
FIG. 17A shows a first position of calculated motion at the running speed (1×) frequency using unaveraged data.
Figure 18A:
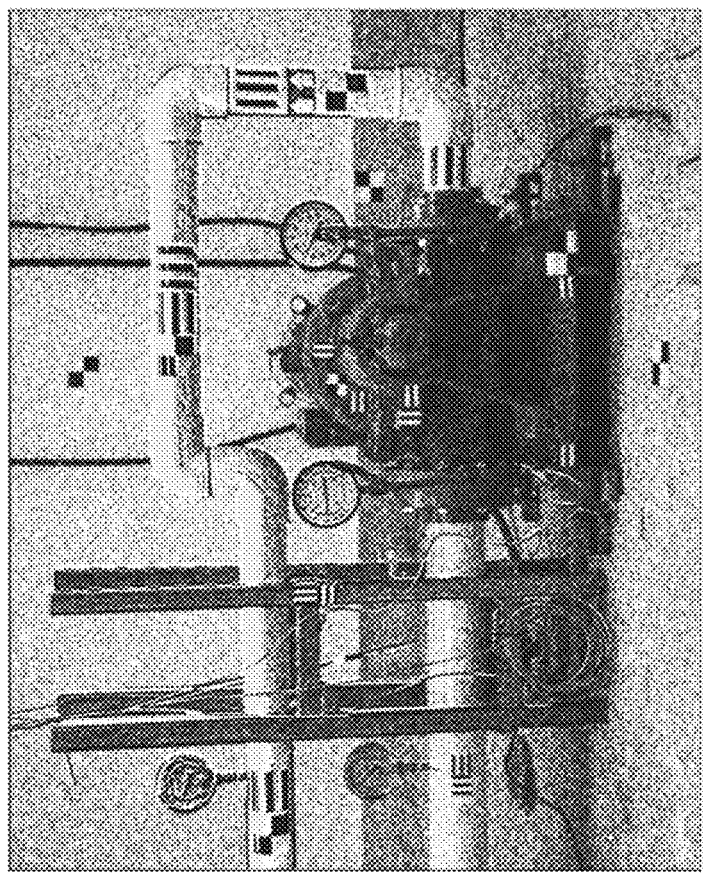
FIG. 18A shows a first position of calculated motion at the running speed (1×) frequency using averaged data.
Figure 18B:
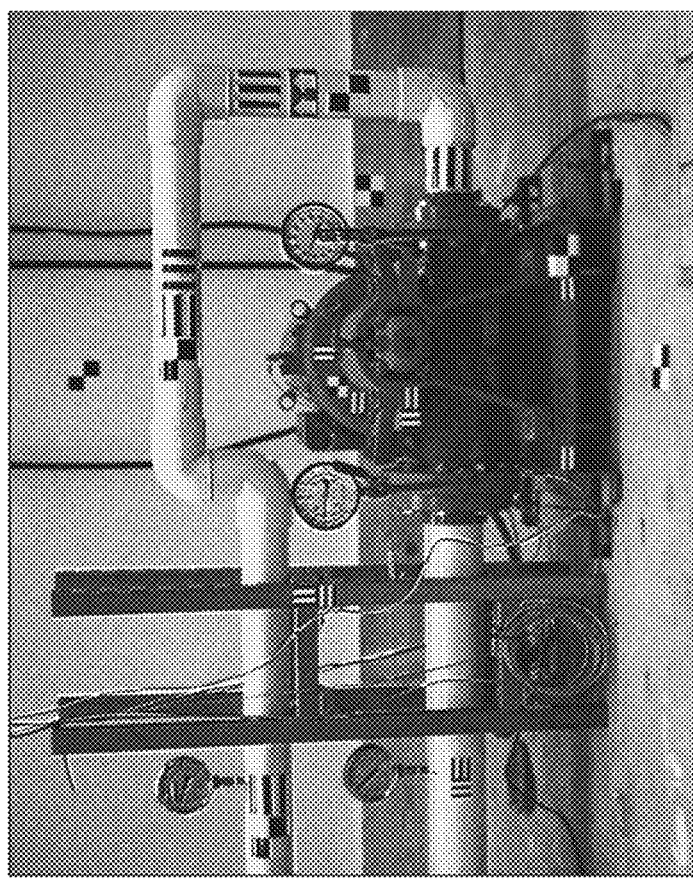
FIG. 18B shows a second position of calculated motion at the running speed (1×) frequency using averaged data.
Figure 17B:
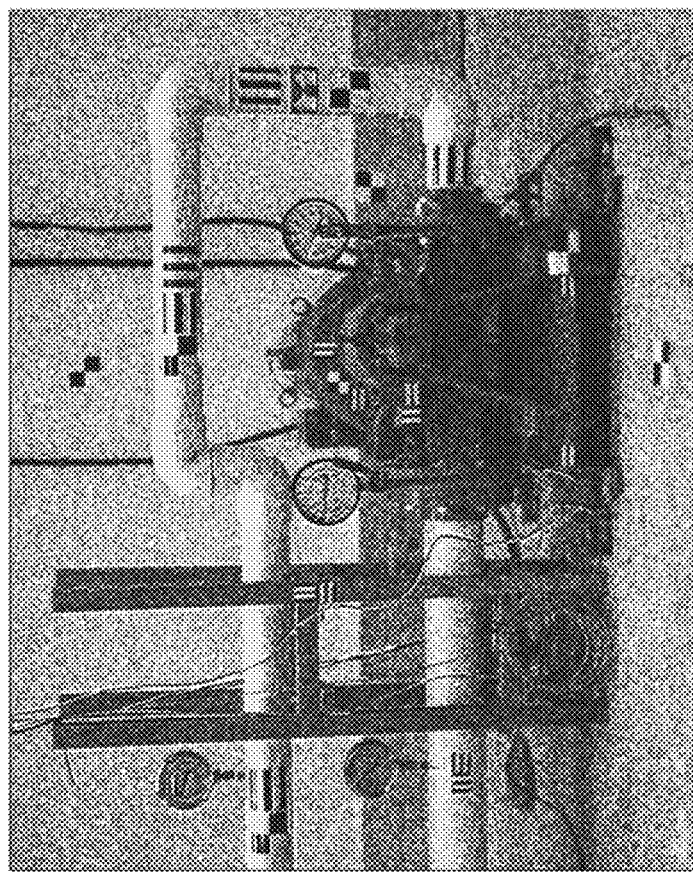
FIG. 17B shows a second position of calculated motion at the running speed (1×) frequency using unaveraged data.
Figure 17C:
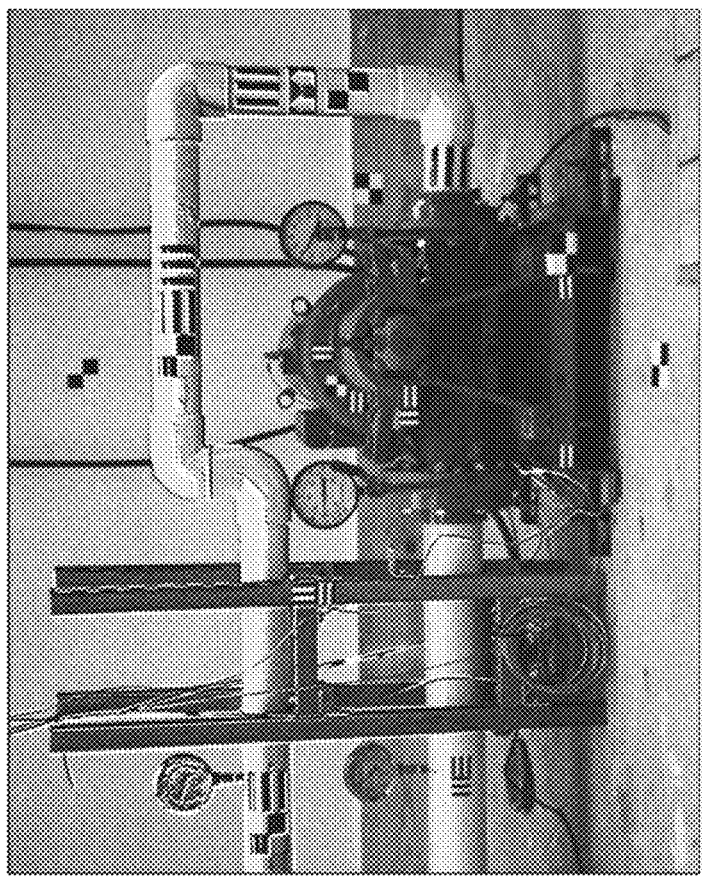
FIG. 17C shows a third position of calculated motion at the running speed (1×) frequency using unaveraged data.
Figure 18C:
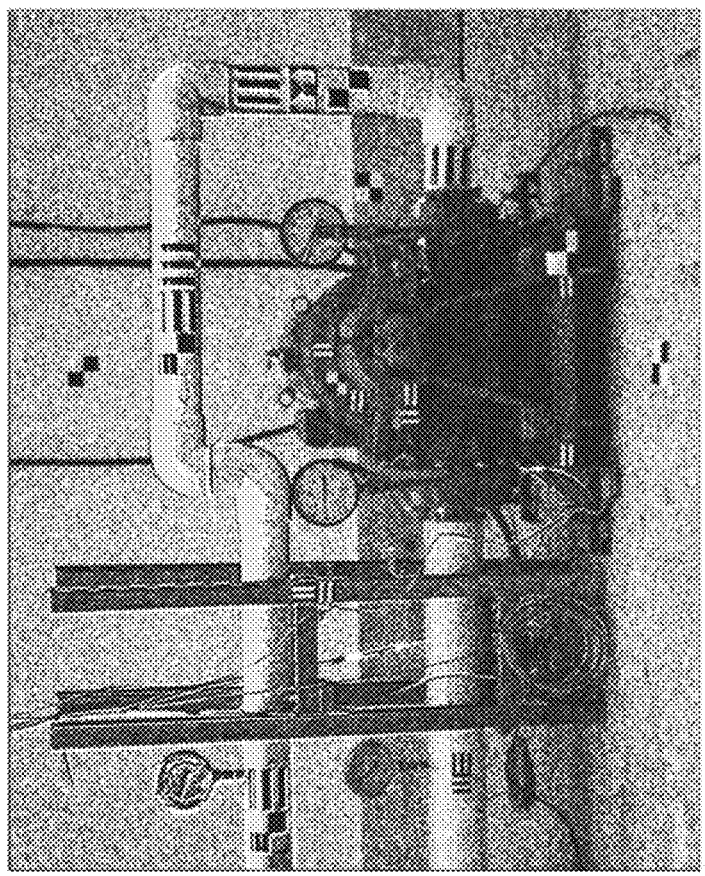
FIG. 18C shows a third position of calculated motion at the running speed (1×) frequency using averaged data.
Figure 18D:
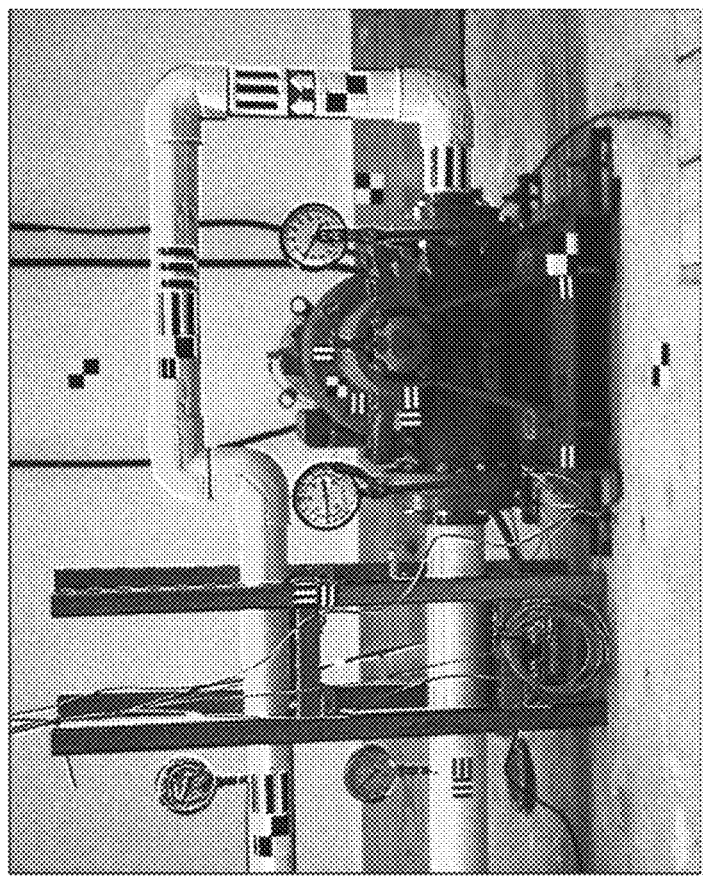
FIG. 18D shows a fourth position of calculated motion at the running speed (1×) frequency using averaged data.
Figure 17D:
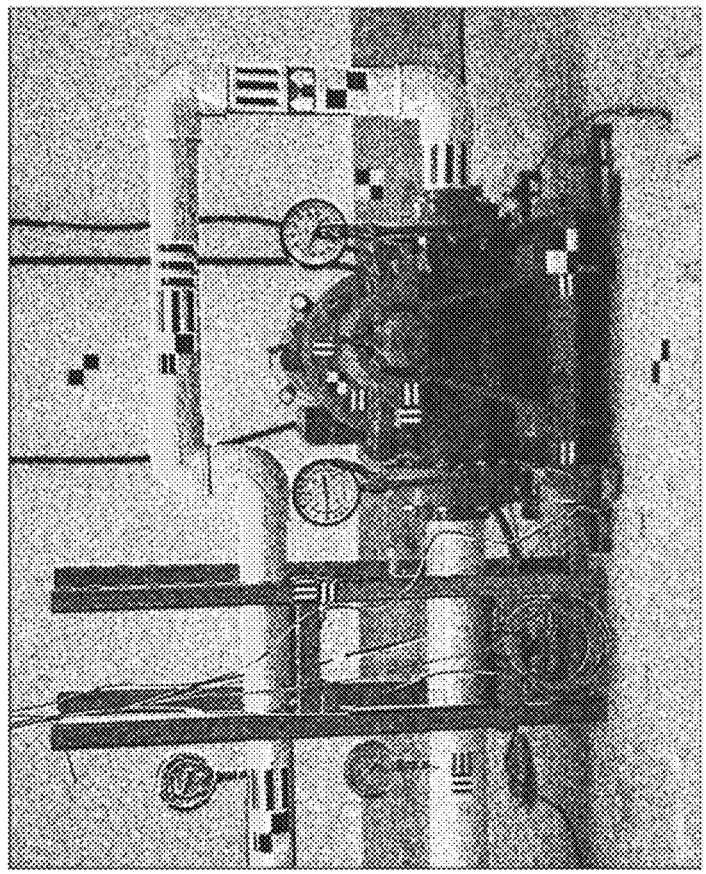
FIG. 17D shows a fourth position of calculated motion at the running speed (1×) frequency using unaveraged data.
Figure 20A:
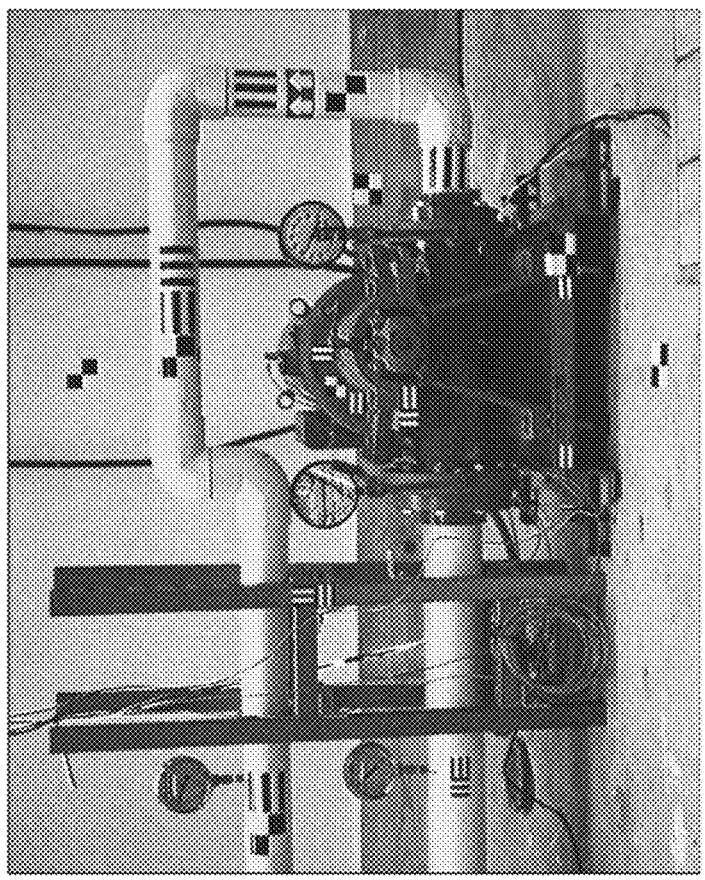
FIG. 20A shows a first position of calculated motion at twice the running speed frequency using averaged data.
Figure 19A:
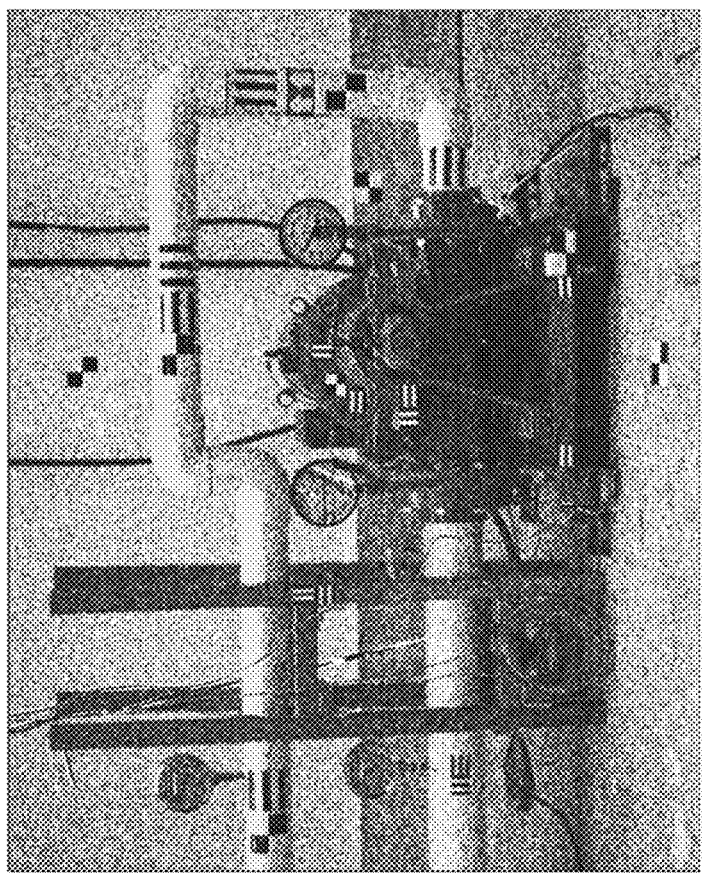
FIG. 19A shows a first position of calculated motion at twice the running speed (2×) frequency using unaveraged data.
Figure 19B:
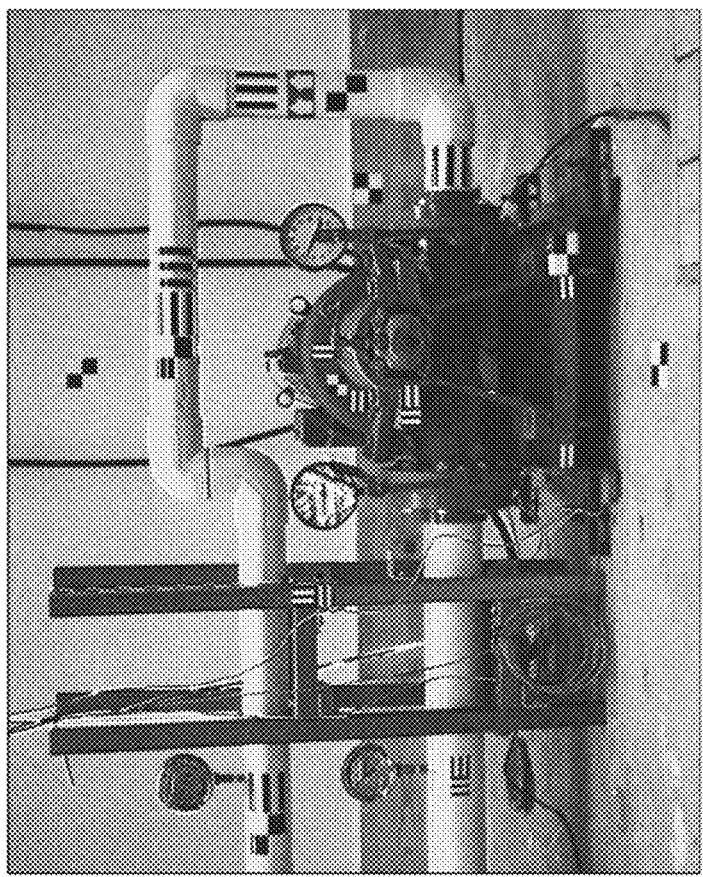
FIG. 19B shows a second position of calculated motion at twice the running speed (2×) frequency using unaveraged data.
Figure 20B:
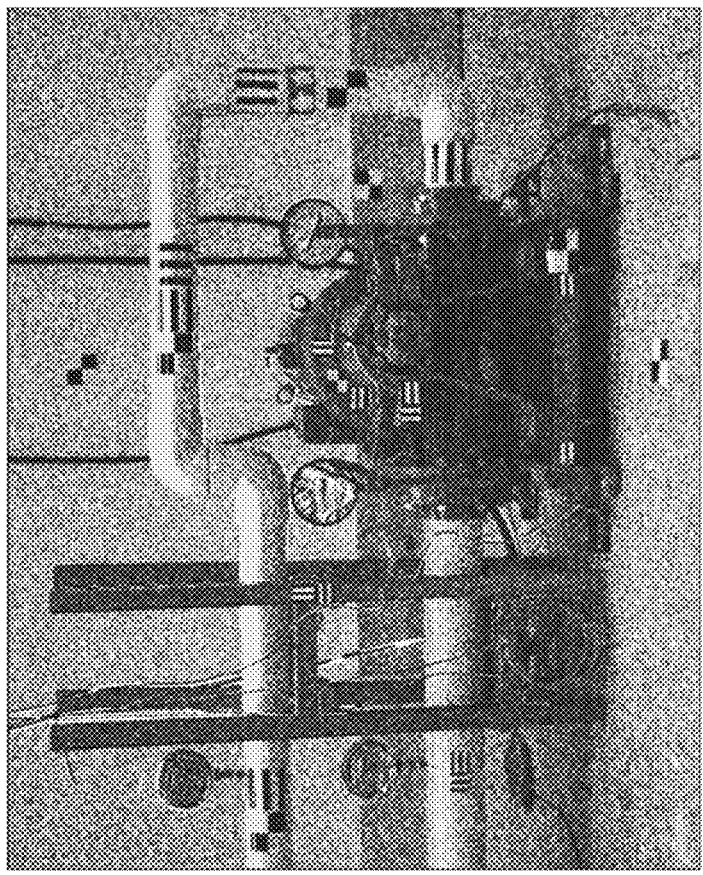
FIG. 20B shows a second position of calculated motion at twice the running speed frequency using averaged data.
Figure 20C:
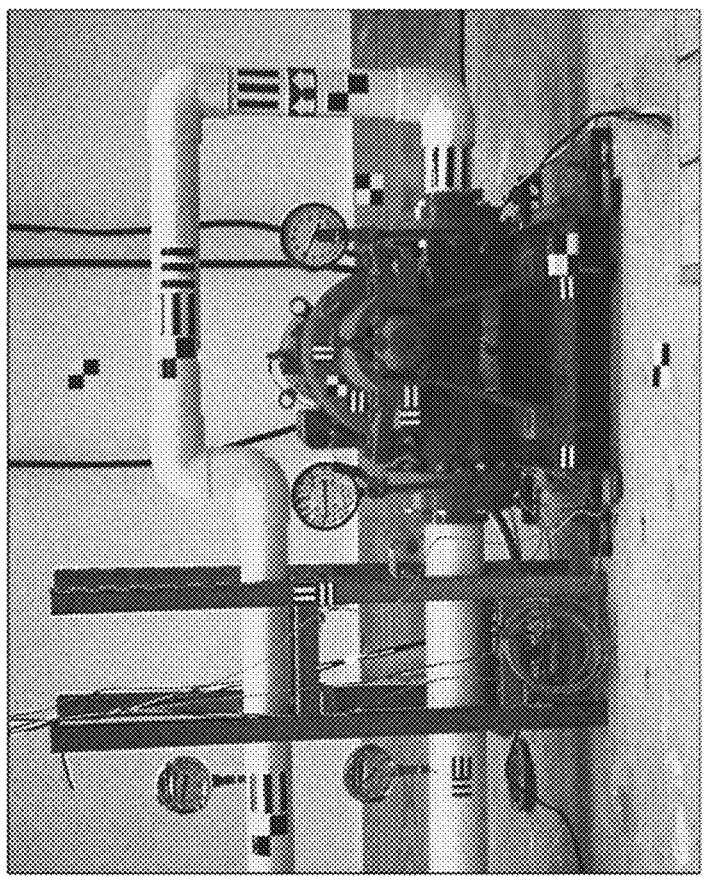
FIG. 20C shows a third position of calculated motion at twice the running speed frequency using averaged data.
Figure 19C:
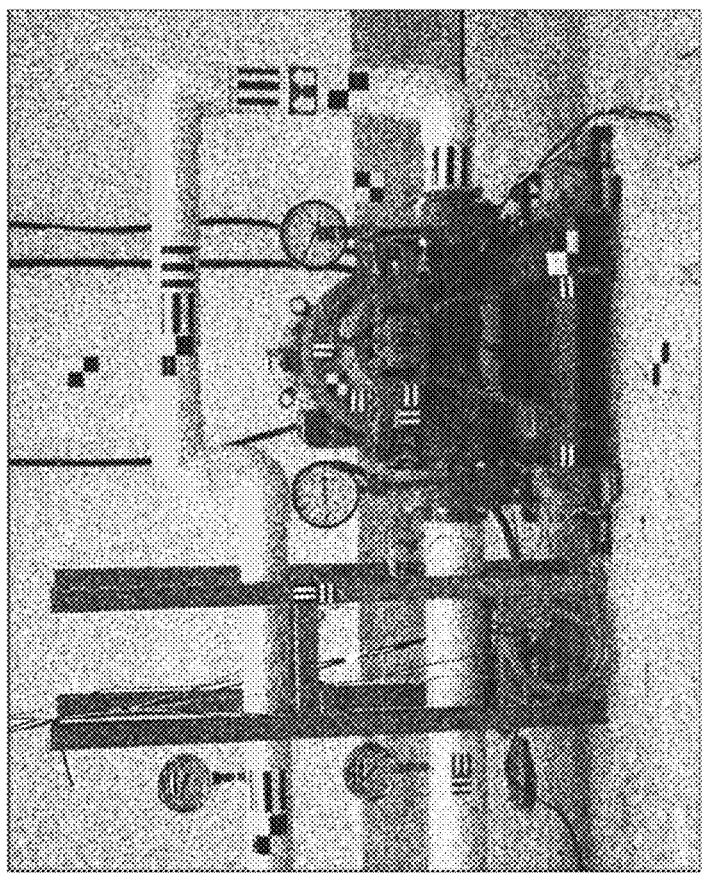
FIG. 19C shows a third position of calculated motion at twice the running speed (2×) frequency using unaveraged data.
Figure 20D:
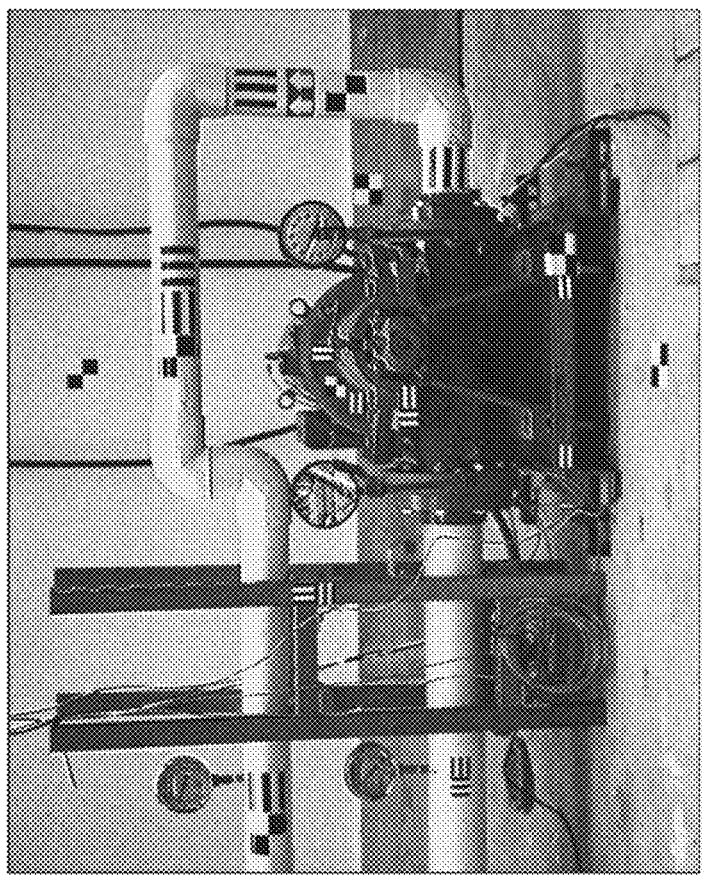
FIG. 20D shows a fourth position of calculated motion at twice the running speed frequency using averaged data.
Figure 19D:
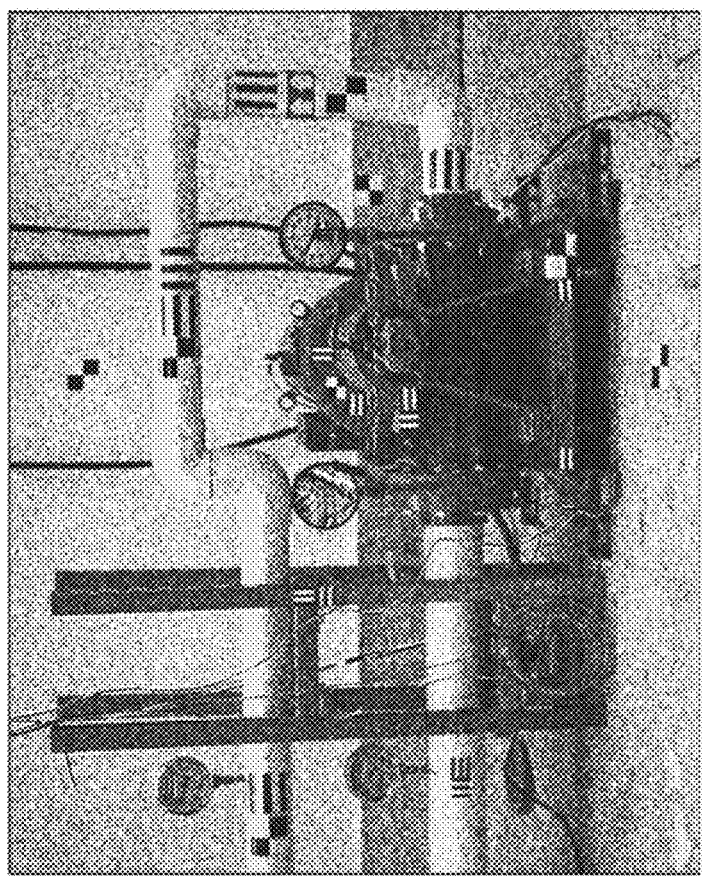
FIG. 19D shows a fourth position of calculated motion at twice the running speed (2×) frequency using unaveraged data.
Figure 22A:
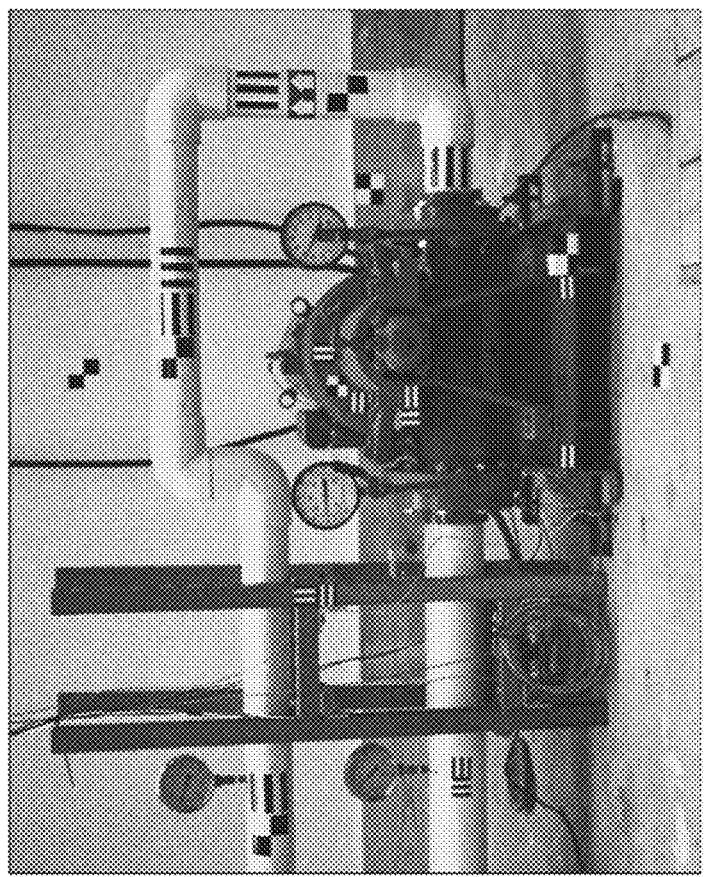
FIG. 22A shows a first position of calculated motion at the vane pass frequency (5×) using averaged data.
Figure 21A:
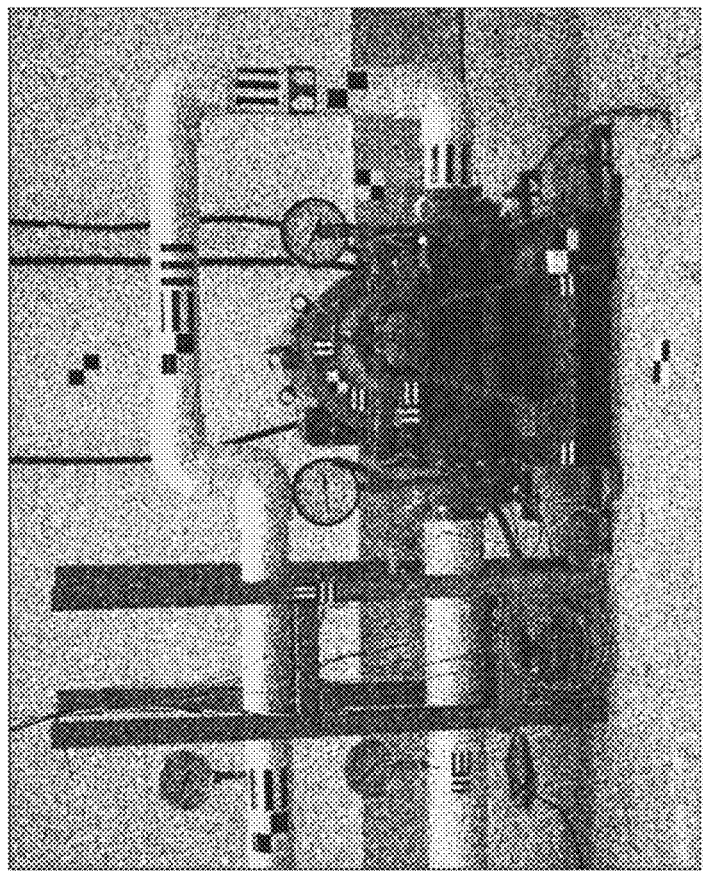
FIG. 21A shows a first position of calculated motion at the vane pass frequency (5×) using unaveraged data.
Figure 21B:
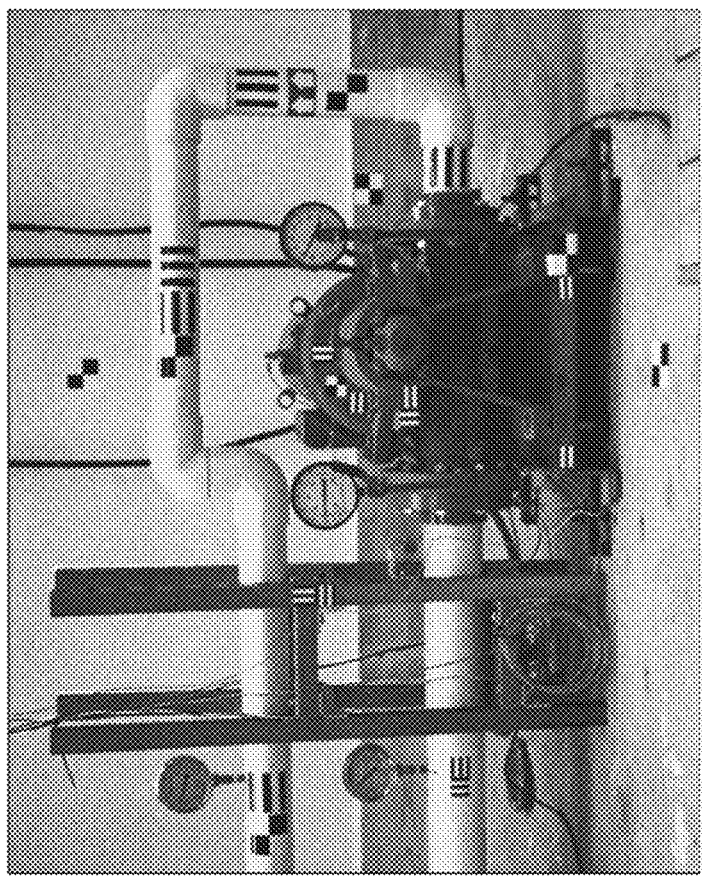
FIG. 21B shows a second position of calculated motion at the vane pass frequency (5×) using unaveraged data.
Figure 22B:
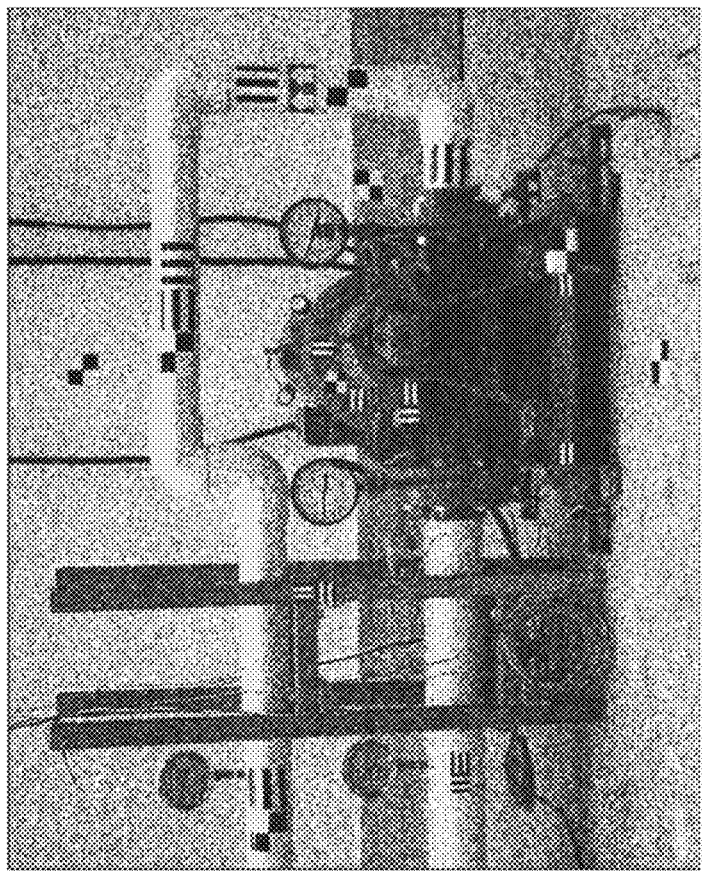
FIG. 22B shows a second position of calculated motion at the vane pass frequency (5×) using averaged data.
Figure 22C:
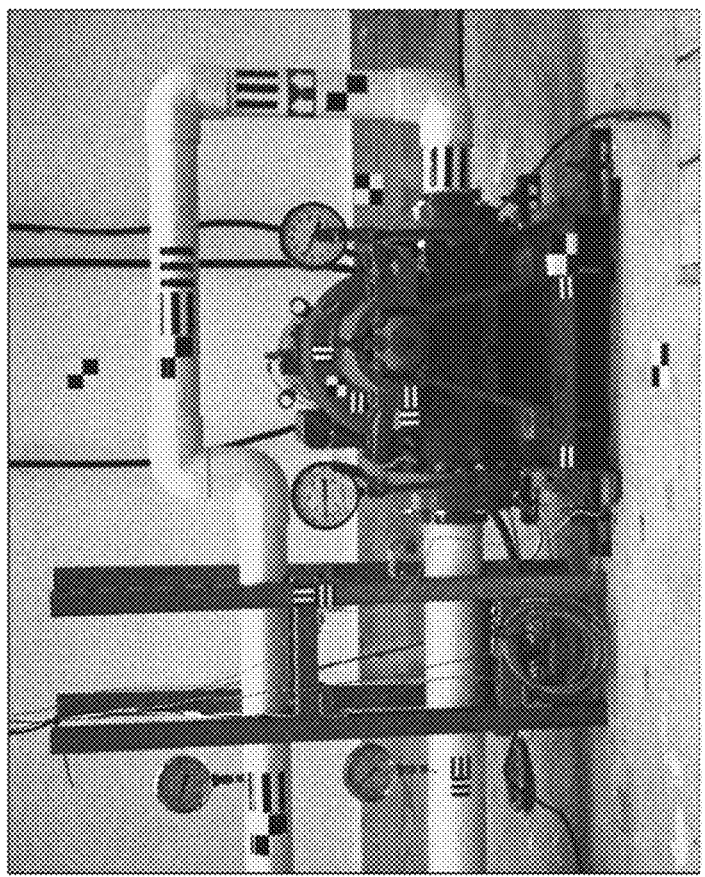
FIG. 22C shows a third position of calculated motion at the vane pass frequency (5×) using averaged data.
Figure 21C:
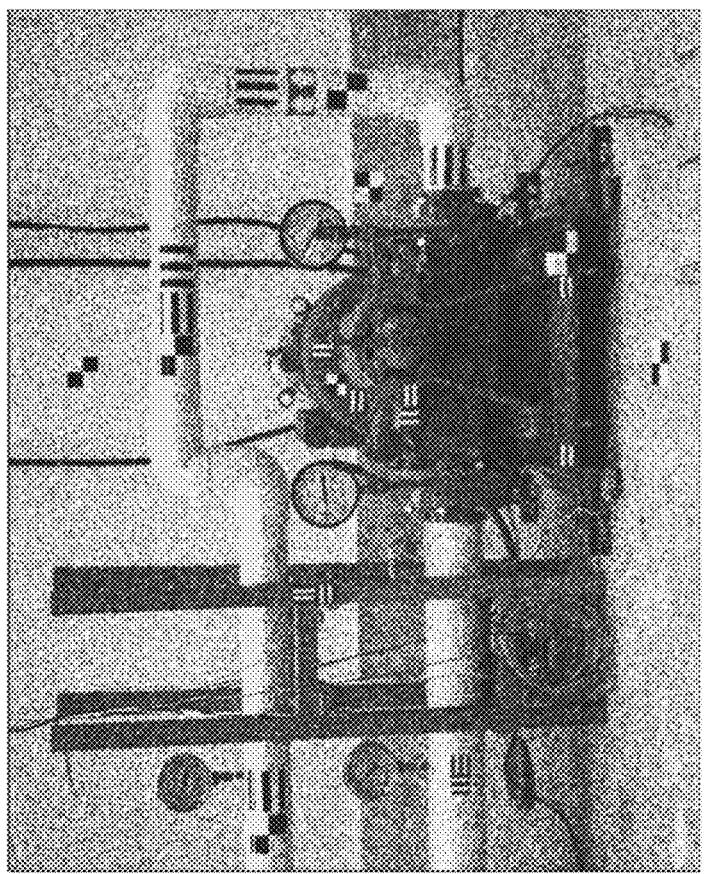
FIG. 21C shows a third position of calculated motion at the vane pass frequency (5×) using unaveraged data.
Figure 22D:
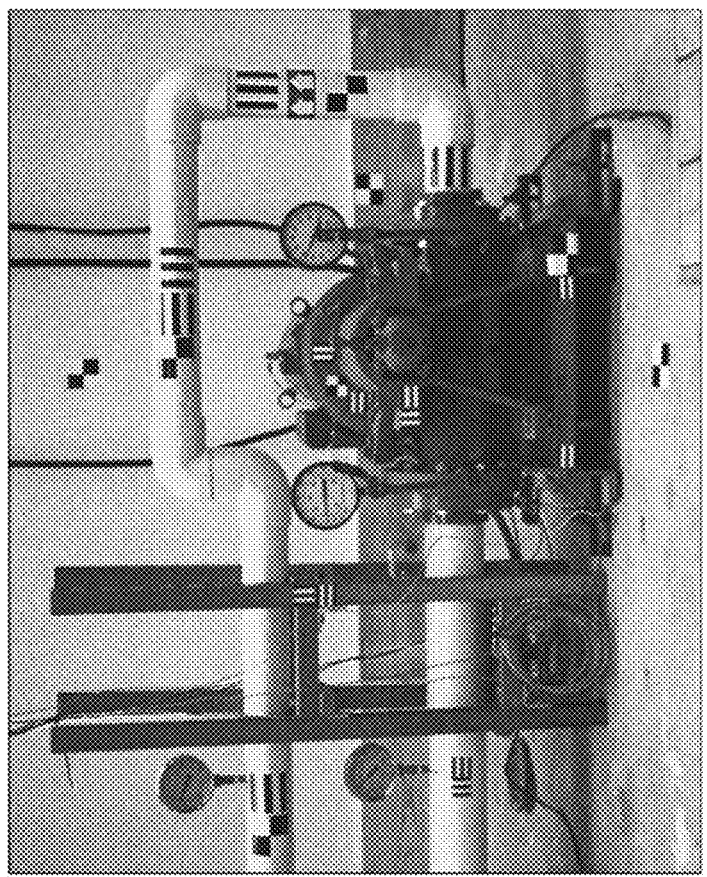
FIG. 22D shows a fourth position of calculated motion at the vane pass frequency (5×) using averaged data.
Figure 21D:
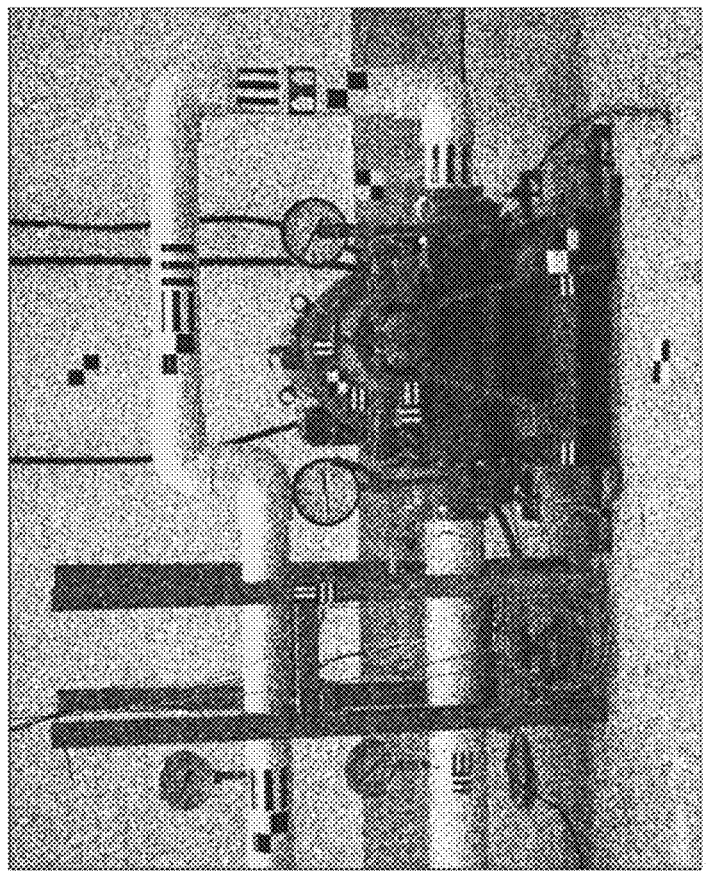
FIG. 21D shows a fourth position of calculated motion at the vane pass frequency (5×) using unaveraged data.

For example, FIGS. 17A-17D show calculated motion at the running speed (1×) 26.7 Hz frequency using unaveraged data. FIG. 17A shows a first position, FIG. 17B shows a second position, FIG. 17C shows a third position, and FIG. 17D shows a fourth position. These Figures may be directly compared with FIGS. 18A-18D which show calculated motion at the running speed (1×) 26.7 Hz frequency using synchronously averaged data (100 averages). FIG. 18A shows the same first position, FIG. 18B shows the same second position, FIG. 18C shows the same third position, and FIG. 18D shows the same fourth position. As can be seen, FIGS. 17A-17D contain snow and blurriness as well as artificial background motion. FIGS. 18A-18D demonstrate greater clarity due to the reduced noise floor and the motion is more clearly shown for the motor driven pump and piping system.

FIGS. 19A-19D show calculated motion at twice the running speed (2×) 53.5 Hz frequency using unaveraged data. These Figures may be directly compared with FIGS. 20A-20D which show calculated motion at twice the running speed (2×) 53.5 Hz frequency using synchronously averaged data (100 averages). FIGS. 19A-19D and 20A-20D show the same respective timing as FIGS. 17A-17D and 18A-18D, namely a first position, second position, third position, and fourth position. Again, the video representation resulting from the use of the disclosed methods (FIGS. 20A-20D) results in clearer video, lower noise, and better visualization of the actual movement in the scene, namely, the displacement of the motor driven pump and piping system and the benefits are readily seen when the videos are compared.

FIGS. 21A-21D show calculated motion at the vane pass frequency (5×) 133.5 Hz frequency using unaveraged data. These Figures may be directly compared with FIGS. 22A-22D which show calculated motion at the vane pass frequency (5×) 133.5 Hz frequency using synchronously averaged data (100 averages). FIGS. 21A-21D and 22A-22D show the same respective timing discussed above, namely a first position, second position, third position, and fourth position. Again, the video representation resulting from the use of the disclosed methods (FIGS. 22A-22D) results in clearer video, lower noise, and better visualization of the actual movement in the scene, namely, the displacement of the motor driven pump and piping system and the benefits are readily seen when the videos are compared.

Figure 23:
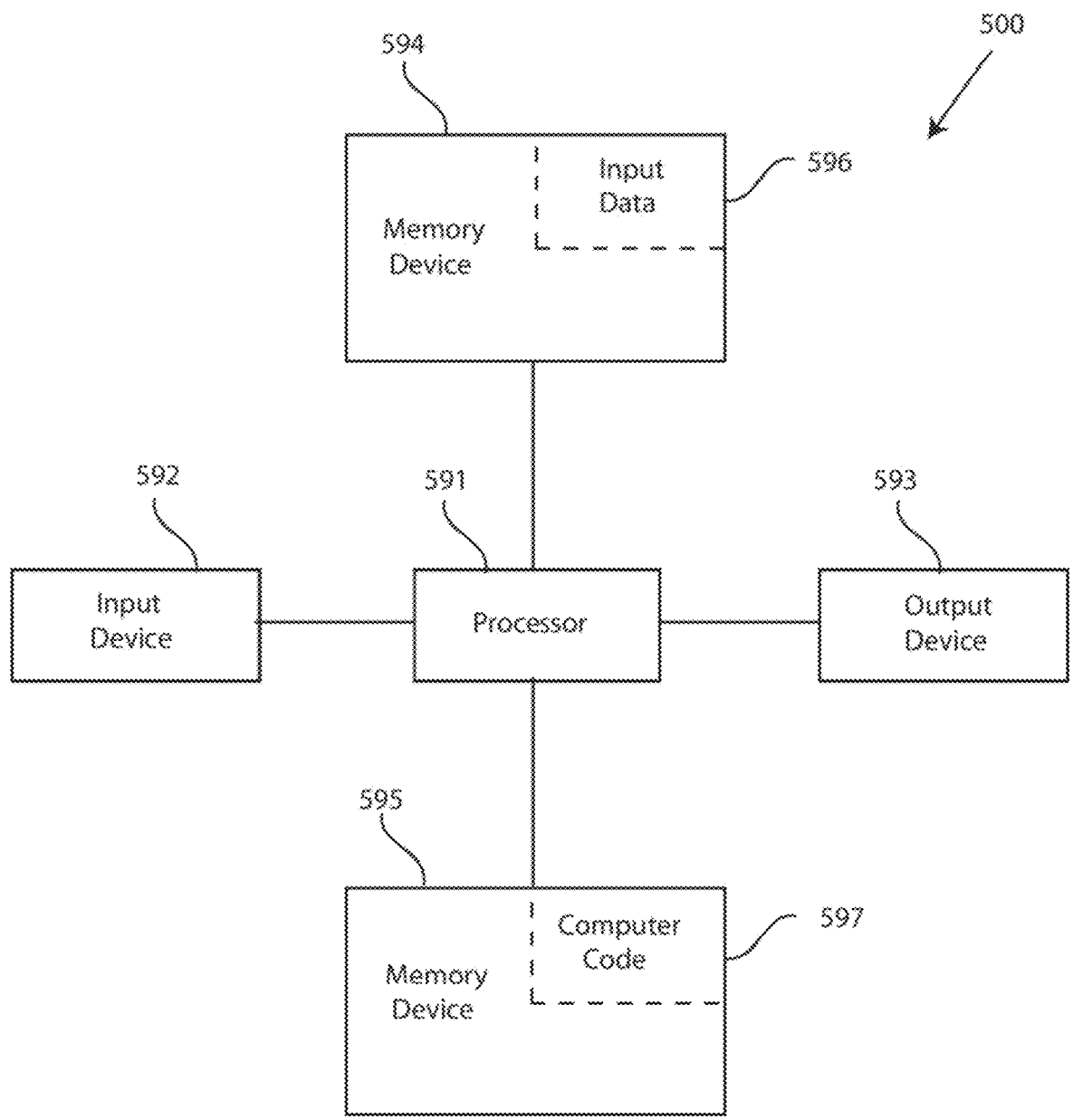
FIG. 23 depicts a block diagram of a computer system for classification system of FIG. 1, capable of implementing a method for detection and analysis of motion FIGS. 2-3 in accordance with embodiments of the present invention.

FIG. 23 depicts a block diagram of a computer system for the time video synchronization system 100 of FIG. 1, capable of implementing methods for detection and analysis of motion of FIGS. 2-3 in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for detection and analysis of motion in the manner prescribed by the embodiments of FIGS. 2-3 using the time video synchronization system 100 of FIG. 1, wherein the instructions of the computer code 597 may be executed by processor 591 via memory device 595. The computer code 597 may include software or program instructions that may implement one or more algorithms for implementing the method for detection and analysis of motion, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to detection and analysis of motion. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 for detection and analysis of motion. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for detection and analysis of motion. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for detection and analysis of motion.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, C#, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 24:
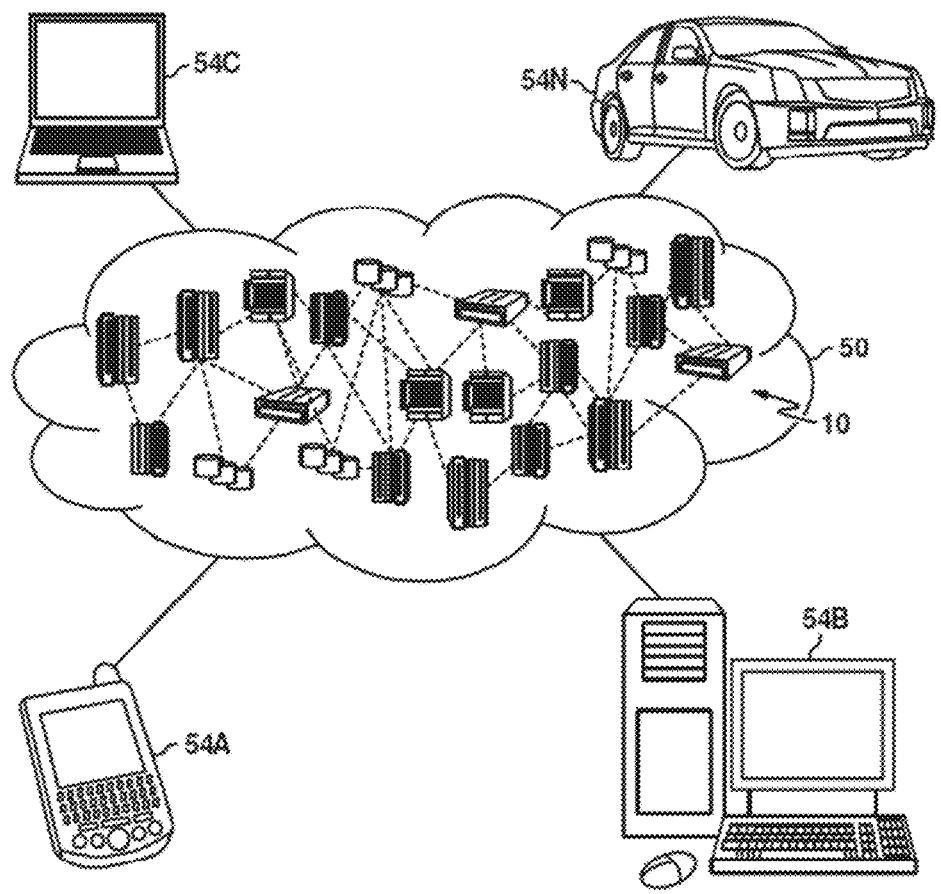
FIG. 24 depicts a cloud computing environment, in accordance with embodiments of the present invention.

Referring now to FIG. 24, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 24 are intended to be illustrative only and that computing nodes 10 and cloud computing environment 50 can communicate with any type of computerized device over any type of network and/or network addressable connection (e.g., using a web browser).

Figure 25:
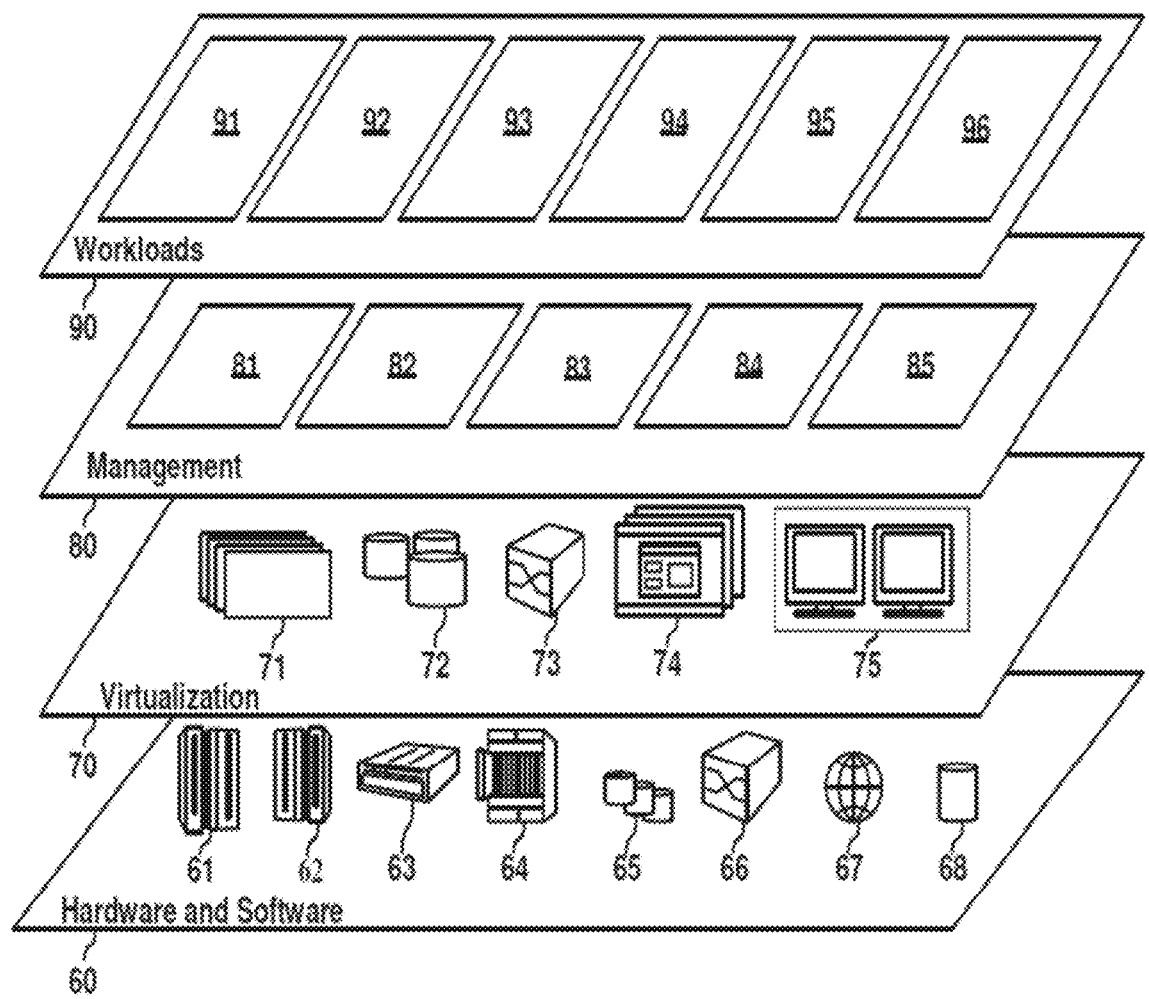
FIG. 25 depicts abstraction model layers, in accordance with embodiments of the present invention.

Referring now to FIG. 25, a set of functional abstraction layers provided by cloud computing environment 50 (see FIG. 24) are shown. It should be understood in advance that the components, layers, and functions shown in FIG. 25 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for detection and analysis of motion 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for detecting motion with respect to an object, comprising:
    providing a processor and at least one video sensor;
    synchronizing the at least one video sensor to an event associated with the object;
    recording, by the at least one video sensor, a plurality of data sets including the object, each data set of the plurality of data sets being synchronized with respect to the event associated with the object;
    averaging, by the processor, the plurality of data sets to provide an averaged synchronized data set, wherein the averaging is per pixel basis averaging and the averaged synchronized data set comprises a pixel-basis averaged data set; and
    calculating, by the processor, a motion with respect to the object based on the averaged synchronized data set.

2. The method of claim 1, further comprising:
    creating a video representing the calculated motion;
    creating an altered video representing a magnified calculated motion;
    extracting displacement data from the averaged synchronized data set;
    extracting displacement data from the plurality of data sets, wherein averaging, by the processor, the plurality of data sets to provide an averaged synchronized data set, includes averaging the extracted displacement data;
    calculating per pixel basis frequency spectra from the plurality of data sets using a Fourier transform; and/or
    averaging the calculated per pixel basis frequency spectra to obtain a per pixel basis averaged synchronized frequency domain data set.

3. The method of claim 1, wherein the object undergoes a repetitive motion and the calculated motion is the repetitive motion.

4. The method of claim 1, wherein the event is associated with one of a time and a phase of the calculated motion.

5. The method of claim 1, wherein the plurality of data sets comprise video recordings.

6. The method of claim 1, wherein synchronizing includes synchronizing to a rotational position, a rotational phase, an impulse, a key phasor, a vibration, and/or an excitation source; and/or wherein synchronizing includes optical, electrical, and/or mechanical synchronization.

7. A system for detecting motion with respect to an object, comprising:
    a processor and at least one video sensor;
    wherein the at least one video sensor is configured to be synchronized to an event associated with the object;
    wherein the at least one video sensor is configured to record a plurality of data sets including the object, each data set of the plurality of data sets being synchronized with respect to the event associated with the object;
    wherein the processor is configured to average the plurality of data sets to provide an averaged synchronized data set, wherein the average is a per pixel basis average and the averaged synchronized data set comprises a pixel-basis averaged data set; and
    wherein the processor is configured to calculate a motion with respect to the object based on the averaged synchronized data.

8. The system of claim 7, wherein the processor is configured to:
    create a video representing the calculated motion;
    create an altered video representing a magnified calculated motion;
    extract displacement data from the averaged synchronized data set;
    extract displacement data from the plurality of data sets, wherein averaging, by the processor, the plurality of data sets to provide an averaged synchronized data set, includes averaging the extracted displacement data;
    calculate per pixel basis frequency spectra from the plurality of data sets using a Fourier transform; and/or
    average the calculated per pixel basis frequency spectra to obtain a per pixel basis averaged synchronized frequency domain data set.

9. The system of claim 7, wherein the object undergoes a repetitive motion and the calculated motion is the repetitive motion.

10. The system of claim 7, wherein the event is associated with one of a time and a phase of the calculated motion.

11. The system of claim 7, wherein synchronization of the video sensor includes synchronizing to a rotational position, a rotational phase, an impulse, a key phasor, a vibration, and/or an excitation source; and/or wherein synchronizing includes optical, electrical, and/or mechanical synchronization.

12. A computer program product, comprising a computer readable hardware storage device storing a computer readable program code, the computer readable program code comprising an algorithm that when executed by a computer processor of a computing system implements a method for detecting motion with respect to an object, the method comprising:
    receiving, from a video sensor, a plurality of data sets including the object, each data set of the plurality of data sets being synchronized with respect to an event associated with the object;
    averaging the plurality of data sets to provide an averaged synchronized data set, wherein the averaging is per pixel basis averaging and the averaged synchronized data set comprises a pixel-basis averaged data set; and
    calculating a motion with respect to the object based on the averaged synchronized data set.

13. The computer program product of claim 12, further comprising:
- creating a video representing the calculated motion;
- creating an altered video representing a magnified calculated motion;
- extracting displacement data from the averaged synchronized data set;
- extracting displacement data from the plurality of data sets, wherein averaging, by the processor, the plurality of data sets to provide an averaged synchronized data set, includes averaging the extracted displacement data;
- calculating per pixel basis frequency spectra from the plurality of data sets using a Fourier transform; and/or
- averaging the calculated per pixel basis frequency spectra to obtain a per pixel basis averaged synchronized frequency domain data set.

14. The computer program product of claim 12, wherein the object undergoes a repetitive motion and the calculated motion is the repetitive motion.

15. The computer program product of claim 12, wherein the event is associated with one of a time and a phase of the calculated motion.

16. The computer program product of claim 12, the plurality of data sets comprise video recordings.

17. The computer program product of claim 12, wherein the method includes synchronizing the video sensor and wherein synchronizing includes synchronizing to a rotational position, a rotational phase, an impulse, a key phasor, a vibration, and/or an excitation source; and/or wherein synchronizing includes optical, electrical, and/or mechanical synchronization.

* * * * *